United States Patent
Wang et al.

(10) Patent No.: US 8,794,526 B2
(45) Date of Patent: Aug. 5, 2014

(54) INDICIA READING TERMINAL PROCESSING PLURALITY OF FRAMES OF IMAGE DATA RESPONSIVELY TO TRIGGER SIGNAL ACTIVATION

(75) Inventors: Ynjiun P. Wang, Cupertino, CA (US);
Edward C. Bremer, Victor, NY (US);
Chen Feng, Snohomish, WA (US);
Colleen P. Gannon, Jordan, NY (US);
William H. Havens, Syracuse, NY (US);
Jianhua Li, Fremont, CA (US);
Timothy P. Meier, Camillus, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 1746 days.

(21) Appl. No.: 12/132,462

(22) Filed: Jun. 3, 2008

(65) Prior Publication Data

US 2009/0026267 A1    Jan. 29, 2009

Related U.S. Application Data

(60) Provisional application No. 60/933,022, filed on Jun. 4, 2007.

(51) Int. Cl.
*G06K 7/10*    (2006.01)

(52) U.S. Cl.
USPC ............. 235/472.01; 235/462.01; 235/462.11

(58) Field of Classification Search
USPC .......... 235/462.01–462.49, 472.01, 435, 439, 235/440
See application file for complete search history.

(56) References Cited

U.S. PATENT DOCUMENTS 4,877,949 A    10/1989    Danielson et al.
5,019,699 A    5/1991    Koenck (Continued)

FOREIGN PATENT DOCUMENTS

CN    101031930    9/2007
CN    101147157    3/2008

(Continued)

OTHER PUBLICATIONS

U.S. Appl. No. 13/174,333, filed Jun. 30, 2011.

(Continued)

*Primary Examiner* — Michael G Lee
*Assistant Examiner* — Laura Gudorf
(74) *Attorney, Agent, or Firm* — Additon, Higgins, Pendleton & Ashe, P.A.

(57) ABSTRACT

There is described a decodable indicia reading terminal which in one embodiment can capture and process a certain (e.g., a first) and a subsequent (e.g., a second) frame of image data, wherein the certain and the subsequent frames have different imaging attributes. In one embodiment the attributes between certain and subsequent frames are differentiated in that the certain frame represents light incident on pixels of a first image sensor and the subsequent frame of image data represents light incident on pixels of a second image sensor spaced apart from the first image sensor. Additionally, or in the alternative, the attributes between certain and subsequent frames can be differentiated in that the first frame represents light incident on an image sensor under a first illumination profile and the subsequent frame represents light incident on pixels of an image sensor under a second illumination profile. In one embodiment imaging attributes of a frame subject to decoding are maintained constant for each frame subject to processing during a time that a trigger signal remains active. In one embodiment the certain and subsequent frames can be processed to yield partial decoding results and the partial decoding results can be combined to form a complete decoding result.

15 Claims, 13 Drawing Sheets

(56) References Cited

U.S. PATENT DOCUMENTS

| | | | |
|---|---|---|---|
| 5,406,062 A | 4/1995 | Hasegawa et al. | |
| 5,504,367 A | 4/1996 | Arackellian et al. | |
| 5,541,419 A | 7/1996 | Aracellian | |
| 5,572,006 A | 11/1996 | Wang et al. | |
| 5,576,529 A | 11/1996 | Koenck et al. | |
| 5,591,955 A | 1/1997 | Laser | |
| 5,646,390 A | 7/1997 | Wang et al. | |
| 5,648,650 A | 7/1997 | Sugifune et al. | |
| 5,701,001 A | 12/1997 | Sugifune et al. | |
| 5,702,058 A | 12/1997 | Dobbs et al. | |
| 5,756,981 A | 5/1998 | Roustaei et al. | |
| 5,770,847 A | 6/1998 | Olmstead | |
| 5,784,102 A | 7/1998 | Hussey et al. | |
| 5,786,582 A | 7/1998 | Roustaei et al. | |
| 5,811,828 A | 9/1998 | Laser | |
| 5,815,200 A | 9/1998 | Ju et al. | |
| 5,821,518 A | 10/1998 | Sussmeier et al. | |
| 5,837,987 A | 11/1998 | Koenck et al. | |
| 5,841,121 A | 11/1998 | Koenck | |
| 5,877,487 A | 3/1999 | Tani et al. | |
| 5,886,338 A | 3/1999 | Arackellian et al. | |
| 5,959,285 A * | 9/1999 | Schuessler | 235/462.04 |
| 6,010,070 A | 1/2000 | Mizuochi et al. | |
| 6,073,851 A | 6/2000 | Olmstead et al. | |
| 6,223,988 B1 | 5/2001 | Batterman et al. | |
| 6,230,975 B1 | 5/2001 | Colley et al. | |
| 6,254,003 B1 | 7/2001 | Pettinelli et al. | |
| 6,283,374 B1 | 9/2001 | Fantone et al. | |
| 6,315,203 B1 | 11/2001 | Ikeda et al. | |
| 6,318,635 B1 * | 11/2001 | Stoner | 235/462.45 |
| 6,347,163 B2 | 2/2002 | Roustaei | |
| 6,386,452 B1 | 5/2002 | Kawamura et al. | |
| 6,412,700 B1 | 7/2002 | Blake et al. | |
| 6,522,441 B1 | 2/2003 | Rudeen | |
| 6,598,797 B2 | 7/2003 | Lee | |
| 6,601,768 B2 | 8/2003 | McCall et al. | |
| 6,669,093 B1 | 12/2003 | Meyerson et al. | |
| 6,681,994 B1 | 1/2004 | Koenck | |
| 6,695,209 B1 | 2/2004 | La | |
| 6,749,120 B2 | 6/2004 | Hung et al. | |
| 6,832,725 B2 | 12/2004 | Gardiner et al. | |
| 6,877,661 B2 | 4/2005 | Webb et al. | |
| 6,880,759 B2 | 4/2005 | Wilde et al. | |
| 7,044,378 B2 | 5/2006 | Patel et al. | |
| 7,055,747 B2 | 6/2006 | Havens et al. | |
| 7,061,395 B1 | 6/2006 | Bromer | |
| 7,073,715 B2 | 7/2006 | Patel et al. | |
| 7,077,321 B2 | 7/2006 | Longacre, Jr. et al. | |
| 7,083,097 B2 | 8/2006 | Toyama et al. | |
| 7,083,098 B2 | 8/2006 | Joseph et al. | |
| 7,148,923 B2 | 12/2006 | Harper et al. | |
| 7,185,817 B2 | 3/2007 | Zhu et al. | |
| 7,219,843 B2 | 5/2007 | Havens et al. | |
| 7,234,641 B2 | 6/2007 | Olmstead | |
| 7,240,844 B2 | 7/2007 | Zhu et al. | |
| 7,255,279 B2 | 8/2007 | Zhu et al. | |
| 7,270,274 B2 | 9/2007 | Hennick et al. | |
| 7,287,696 B2 | 10/2007 | Attia et al. | |
| 7,303,126 B2 | 12/2007 | Patel et al. | |
| 7,308,375 B2 | 12/2007 | Jensen et al. | |
| 7,320,431 B2 | 1/2008 | Zhu et al. | |
| 7,336,197 B2 | 2/2008 | Ding et al. | |
| 7,357,326 B2 | 4/2008 | Hattersley et al. | |
| 7,382,911 B1 | 6/2008 | Meier et al. | |
| 7,387,250 B2 | 6/2008 | Mani | |
| 7,398,927 B2 | 7/2008 | Olmstead et al. | |
| 7,490,778 B2 | 2/2009 | Zhu et al. | |
| 7,503,499 B2 | 3/2009 | Zhu et al. | |
| 7,513,430 B2 | 4/2009 | Zhu et al. | |
| 7,516,899 B2 | 4/2009 | Laser | |
| 7,527,207 B2 | 5/2009 | Acosta et al. | |
| 7,533,824 B2 | 5/2009 | Hennick et al. | |
| 7,568,628 B2 | 8/2009 | Wang et al. | |
| 7,611,060 B2 | 11/2009 | Wang et al. | |
| 7,656,556 B2 | 2/2010 | Wang | |
| 7,693,744 B2 | 4/2010 | Forbes | |
| 7,717,343 B2 | 5/2010 | Havens et al. | |
| 7,735,737 B2 | 6/2010 | Kotlarsky et al. | |
| 7,762,464 B2 | 7/2010 | Goren et al. | |
| 7,770,799 B2 | 8/2010 | Wang | |
| 7,775,436 B2 | 8/2010 | Knowles | |
| 7,780,089 B2 | 8/2010 | Wang | |
| 7,809,407 B2 | 10/2010 | Oshima et al. | |
| 7,810,720 B2 | 10/2010 | Lovett | |
| 7,813,047 B2 | 10/2010 | Wang et al. | |
| 7,878,403 B2 | 2/2011 | Hennick et al. | |
| 7,909,257 B2 | 3/2011 | Wang et al. | |
| 7,918,398 B2 | 4/2011 | Li et al. | |
| 7,946,493 B2 | 5/2011 | Havens et al. | |
| 7,995,178 B2 | 8/2011 | Suguro et al. | |
| 8,027,095 B2 | 9/2011 | Havens | |
| 8,027,096 B2 | 9/2011 | Feng et al. | |
| 8,038,066 B2 | 10/2011 | Havens et al. | |
| 8,074,887 B2 | 12/2011 | Havens et al. | |
| 2001/0003346 A1 | 6/2001 | Feng | |
| 2002/0125322 A1 | 9/2002 | McCall et al. | |
| 2003/0019934 A1 | 1/2003 | Hunter et al. | |
| 2003/0029917 A1 | 2/2003 | Hennick et al. | |
| 2003/0034394 A1 | 2/2003 | Gannon et al. | |
| 2003/0062413 A1 | 4/2003 | Gardiner et al. | |
| 2003/0089776 A1 | 5/2003 | Hennick et al. | |
| 2003/0213847 A1 | 11/2003 | McCall et al. | |
| 2003/0222147 A1 | 12/2003 | Havens et al. | |
| 2004/0020990 A1 | 2/2004 | Havens et al. | |
| 2004/0164165 A1 * | 8/2004 | Havens et al. | 235/462.43 |
| 2005/0001035 A1 | 1/2005 | Hawley et al. | |
| 2005/0023356 A1 | 2/2005 | Wiklof et al. | |
| 2005/0103854 A1 | 5/2005 | Zhu et al. | |
| 2005/0279836 A1 | 12/2005 | Havens et al. | |
| 2006/0011724 A1 | 1/2006 | Joseph et al. | |
| 2006/0043194 A1 | 3/2006 | Barkan et al. | |
| 2006/0113386 A1 | 6/2006 | Olmstead | |
| 2006/0163355 A1 * | 7/2006 | Olmstead et al. | 235/454 |
| 2006/0202036 A1 | 9/2006 | Wang et al. | |
| 2006/0202038 A1 | 9/2006 | Wang et al. | |
| 2006/0249581 A1 | 11/2006 | Smith | |
| 2007/0040034 A1 | 2/2007 | Hennick et al. | |
| 2007/0063048 A1 | 3/2007 | Havens et al. | |
| 2007/0080280 A1 | 4/2007 | Havens | |
| 2007/0138293 A1 | 6/2007 | Zhu et al. | |
| 2007/0156021 A1 | 7/2007 | Morse et al. | |
| 2007/0158428 A1 | 7/2007 | Havens et al. | |
| 2007/0181692 A1 | 8/2007 | Barkan et al. | |
| 2007/0267501 A1 * | 11/2007 | Jovanovski et al. | 235/472.01 |
| 2007/0284447 A1 | 12/2007 | McQueen | |
| 2008/0023556 A1 | 1/2008 | Vinogradov et al. | |
| 2008/0144185 A1 | 6/2008 | Wang et al. | |
| 2008/0144186 A1 | 6/2008 | Feng et al. | |
| 2008/0223933 A1 | 9/2008 | Smith | |
| 2008/0223934 A1 | 9/2008 | Havens et al. | |
| 2009/0026267 A1 | 1/2009 | Wang et al. | |
| 2009/0057413 A1 | 3/2009 | Vinogradov et al. | |
| 2009/0072038 A1 | 3/2009 | Li et al. | |
| 2009/0088203 A1 | 4/2009 | Havens et al. | |
| 2009/0140050 A1 | 6/2009 | Liu et al. | |
| 2009/0236424 A1 | 9/2009 | Hennick et al. | |
| 2010/0044436 A1 | 2/2010 | Powell et al. | |
| 2010/0044440 A1 | 2/2010 | Wang et al. | |
| 2010/0078477 A1 | 4/2010 | Wang et al. | |
| 2010/0090007 A1 | 4/2010 | Wang et al. | |
| 2010/0108769 A1 | 5/2010 | Wang et al. | |
| 2010/0147956 A1 | 6/2010 | Wang et al. | |
| 2010/0225757 A1 | 9/2010 | Li et al. | |
| 2010/0276490 A1 | 11/2010 | Havens et al. | |
| 2010/0276491 A1 | 11/2010 | Havens et al. | |
| 2010/0276492 A1 | 11/2010 | Wang et al. | |
| 2010/0276493 A1 | 11/2010 | Havens et al. | |
| 2011/0017829 A1 | 1/2011 | Wang et al. | |
| 2011/0036908 A1 | 2/2011 | Havens et al. | |
| 2011/0036911 A1 | 2/2011 | Havens et al. | |
| 2011/0089245 A1 | 4/2011 | Havens et al. | |
| 2011/0121076 A1 | 5/2011 | Hennick et al. | |
| 2011/0163165 A1 | 7/2011 | Liu et al. | |
| 2011/0163166 A1 | 7/2011 | Wang et al. | |

(56) References Cited

U.S. PATENT DOCUMENTS

| | | |
|---|---|---|
| 2011/0174880 A1 | 7/2011 | Wang et al. |
| 2011/0212751 A1 | 9/2011 | Havens et al. |
| 2012/0000982 A1 | 1/2012 | Gao et al. |
| 2012/0111944 A1 | 5/2012 | Gao et al. |
| 2012/0138684 A1 | 6/2012 | Van Volkinsburg et al. |
| 2012/0153022 A1 | 6/2012 | Havens et al. |
| 2012/0193429 A1 | 8/2012 | Van Volkinsburg et al. |

FOREIGN PATENT DOCUMENTS

| | | |
|---|---|---|
| EP | 1784761 | 5/2007 |
| EP | 1828957 | 9/2007 |
| EP | 1856651 | 11/2007 |
| EP | 2385481 | 11/2011 |
| JP | 2008511917 | 4/2008 |
| WO | WO-2006026141 | 3/2006 |
| WO | WO-2006065450 | 6/2006 |
| WO | WO-2006081466 | 8/2006 |

OTHER PUBLICATIONS

U.S. Appl. No. 13/309,195, filed Dec. 1, 2011.
U.S. Appl. No. 13/170,104, filed Jun. 27, 2011.
U.S. Appl. No. 13/324,197, filed Dec. 13, 2011.
U.S. Appl. No. 13/428,500, filed Mar. 23, 2012.
European Patent Office, European Patent Application No. 11005505.0, Notification of European Publication Number and Communication of Extended Search Report dated Oct. 12, 2011 (9 pages).
Extended European Search Report for European Patent Application No. 08010217, Dated Oct. 17, 2008, 3 pages.
European Patent Office, European Patent Application No. 08 010 217.1-1248, Office Action dated Jun. 26, 2009 (3 pgs.).
US 8,047,439, 10/2011, Havens et al. (withdrawn).

* cited by examiner

CERTAIN FRAME  SUBSEQUENT FRAME

CERTAIN FRAME  SUBSEQUENT FRAME

INDICIA READING TERMINAL PROCESSING PLURALITY OF FRAMES OF IMAGE DATA RESPONSIVELY TO TRIGGER SIGNAL ACTIVATION

CROSS REFERENCE TO RELATED APPLICATIONS

This application claims priority under 35 U.S.C. §119(e) to Provisional Patent Application No. 60/933,022, entitled "Indicia Reading Terminal Processing Plurality of Frames of Image Data Responsively To Trigger Signal Activation" filed Jun. 4, 2007. This application is also related to U.S. patent application Ser. No. (Not Yet Assigned) (Attorney Docket No. H28366) entitled "Indicia Reading Terminal Having Multiple Setting Imaging Lens" filed concurrently herewith. Each of the above applications is incorporated herein by reference in its entirety.

FIELD OF THE INVENTION

The invention relates to data collection registers in general, and specifically, to an indicia reading terminal.

BACKGROUND OF THE INVENTION

Indicia reading terminals for reading decodable indicia are available in multiple varieties. For example, minimally featured indicia reading terminals devoid of a keyboard and display are common in point of sale applications. Indicia reading terminals devoid of a keyboard and display are available in the recognizable gun style form factor having a handle and trigger button that can be actuated by an index finger. Keyboard and display equipped indicia reading terminals are also presently available. Indicia reading terminals having keyboards and displays are also available. Keyboards and display equipped indicia reading terminals are commonly used in shipping and warehouse applications, and are available in form factors incorporating a display and keyboard. In a keyboard and display equipped indicia reading terminal, a trigger button for actuating the output of decoded messages is typically provided in such locations as to enable actuation by a thumb of an operator. Indicia reading terminals in a form devoid of a keyboard and display or in a keyboard and display equipped form are commonly used in a variety of data collection applications including point of sale applications, shipping applications, warehousing applications, security check point applications, and patient care applications. Some indicia reading terminals are adapted to read bar code symbols including one or more of one dimensional bar codes stacked 1D bar codes and two dimensional bar codes. Other indicia reading terminals are adapted to read OCR characters while still other indicia reading terminals are equipped to read both bar code symbols and OCR characters. Indicia reading terminals commonly include prepackaged single image sensor imaging modules. An example of a prepackaged single image sensor imaging module is the 5×00 Engine Series imaging module available from Hand Held Products, Inc. of Skaneateles Falls, N.Y. Such imaging modules commonly carry illumination (e.g., light source) and imaging components. In the 5×00 Engine Series imaging module, commands to establish the imaging parameter settings (e.g., gain, exposure) are transmitted from a motherboard disposed image capture and processing circuit to an imaging module disposed image sensor integrated circuit over a two wire interface bus wherein the two wire interface bus includes a pair of contacts of the imaging module. In the 5×00 imaging module, commands for switching between operational modes are also transmitted over the two wire interface bus from the motherboard disposed image capture processing circuit to an imaging module microcontroller that is in communication with a light source regulator. The operational modes are differentiated in terms of the particular light sources that are energized during a read attempt, and the timing, during a read attempt, between the energizing of particular light sources, and sensor exposure periods. The microcontroller of the aforementioned 5×00 Engine Series imaging module is provided by a programmable-system-on-chip (PSOC) of the type available from Cypress Semiconductor.

BRIEF DESCRIPTIONS OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

Figure 16:
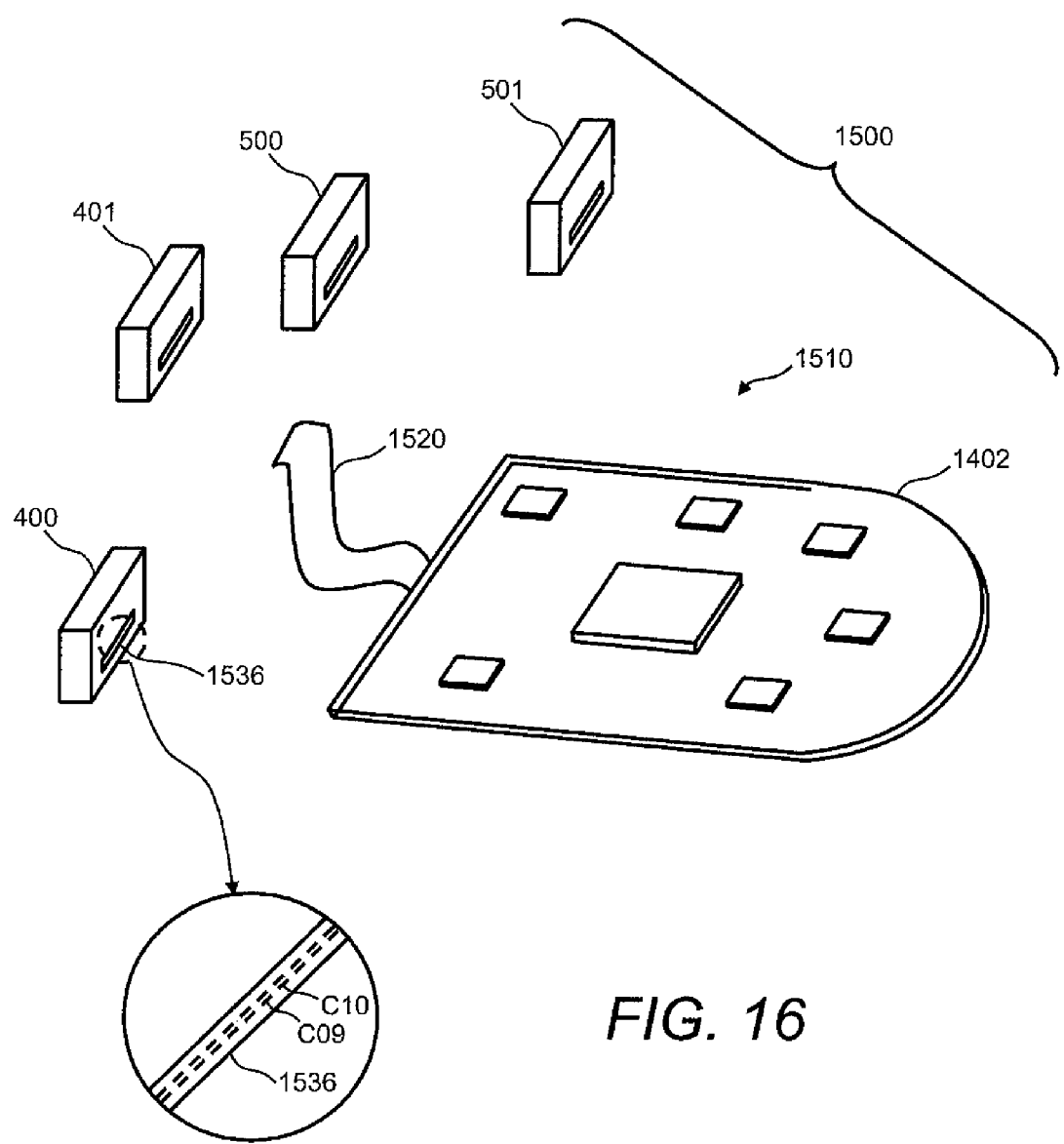

FIG. 16 is a perspective view of a kit for use in manufacturing an imaging indicia reading terminal. A kit can have an image capture and processing circuit that can receive and process image data corresponding to image signals from any one of a variety of different candidate imaging modules. The image capture and processing circuit can be disposed on a motherboard spaced apart from an imaging module.

Figure 17:
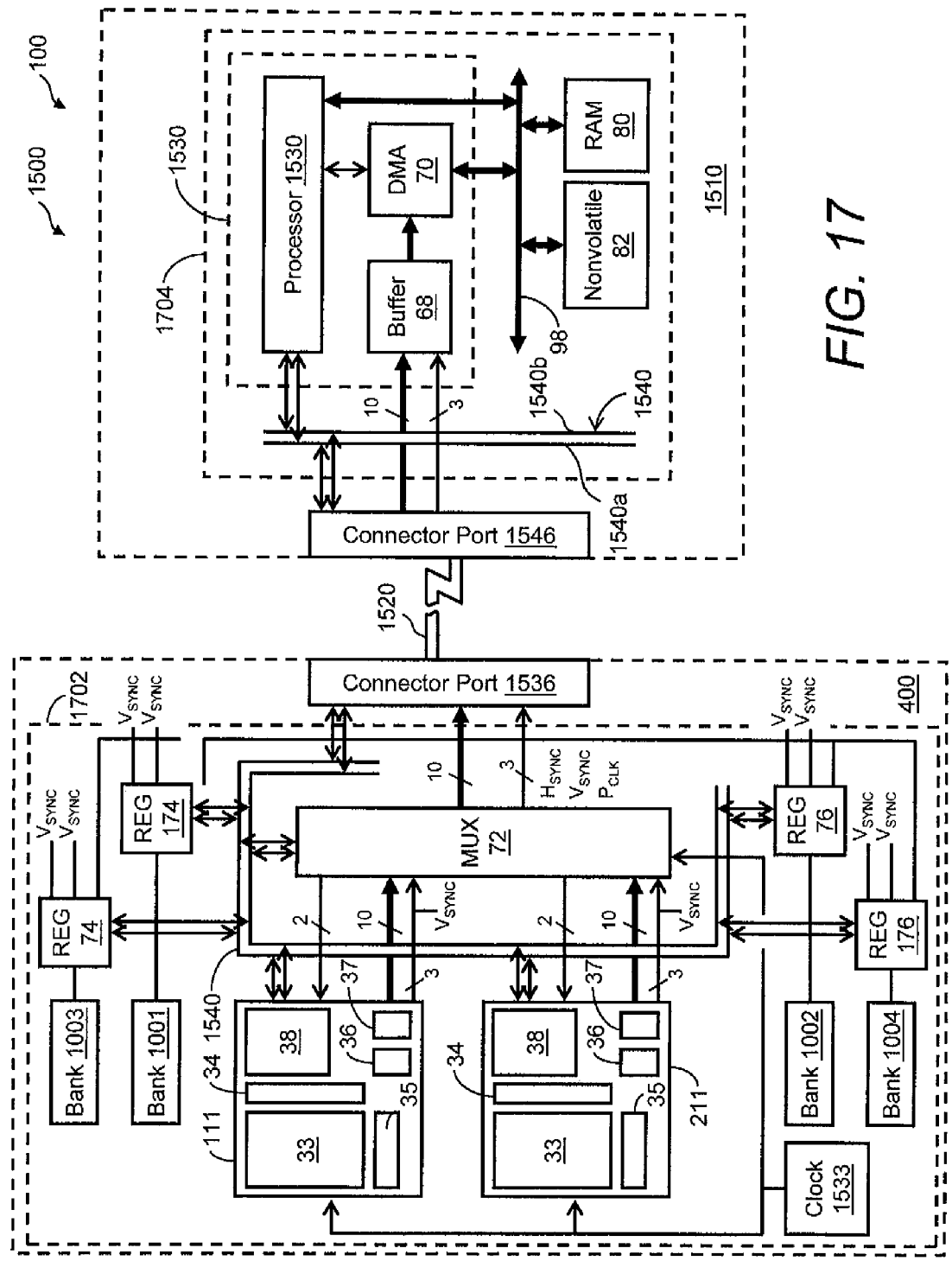

FIG. 17 is a block diagram of an imaging module connected to an image capture and processing circuit. In the embodiment of FIG. 17, an imaging module includes a plurality of image sensors. Image data representing light incident on either of the image sensors of the example of FIG. 17 can be transmitted through a certain set of video contacts of the imaging module.

Figure 18:
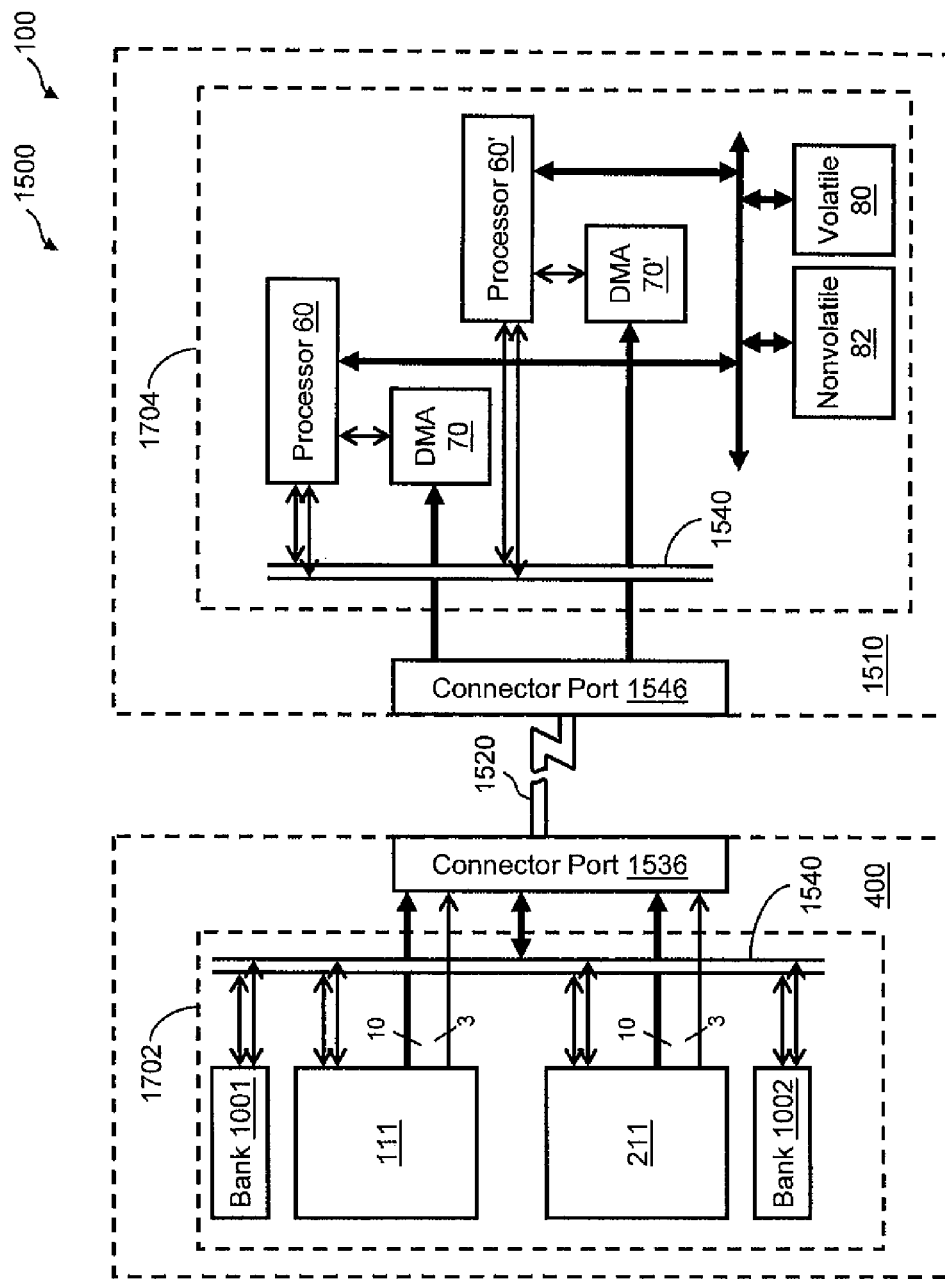

FIG. 18 is a block diagram illustrating a plural image sensor imaging module having plural image data output busses, wherein image data corresponding to first and second image sensors can be simultaneously output to an image capture and processing circuit.

Figure 19:
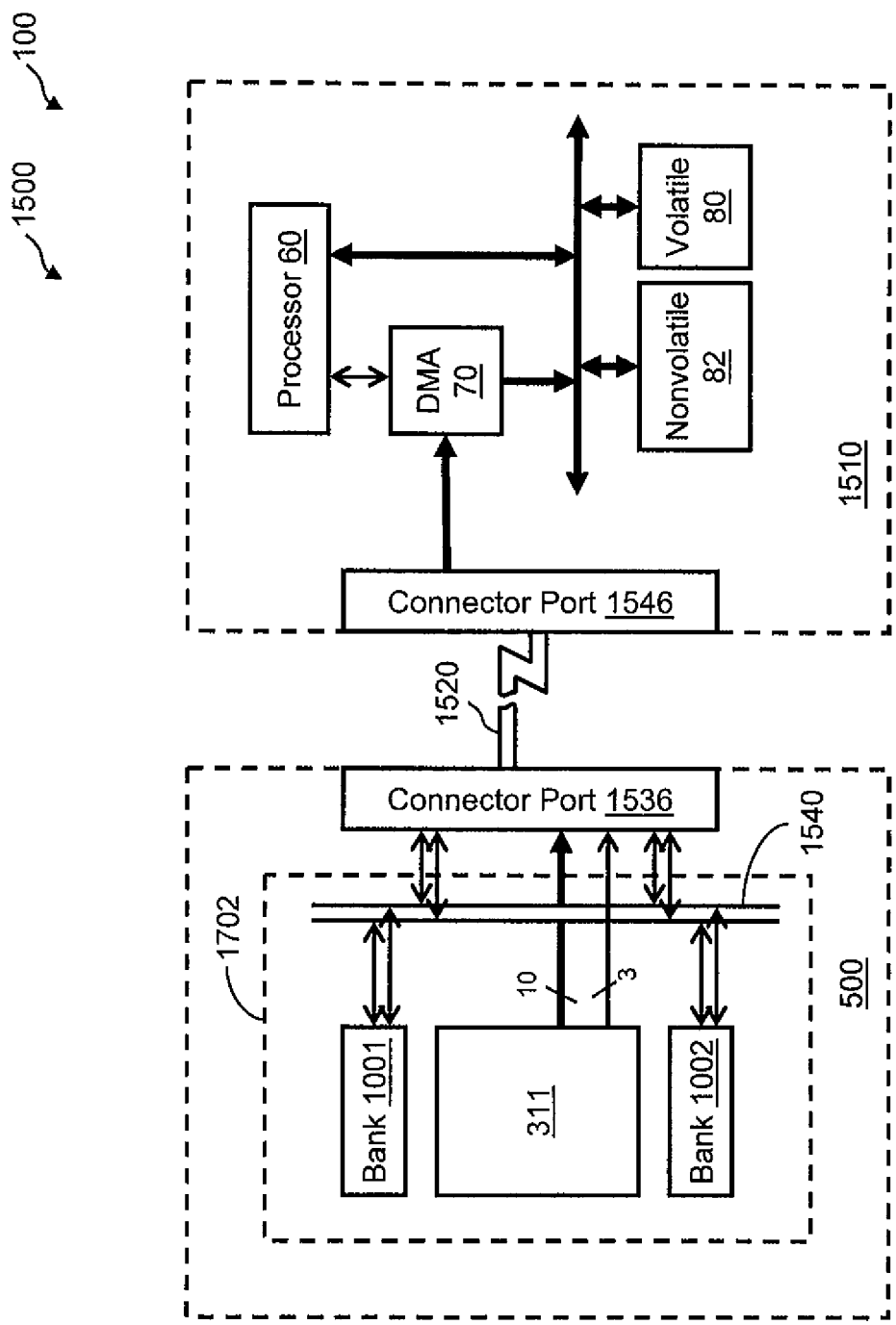

FIG. 19 is a block diagram illustrating a single image sensor imaging module interfaced to an image capture and processing circuit.

Figure 20:
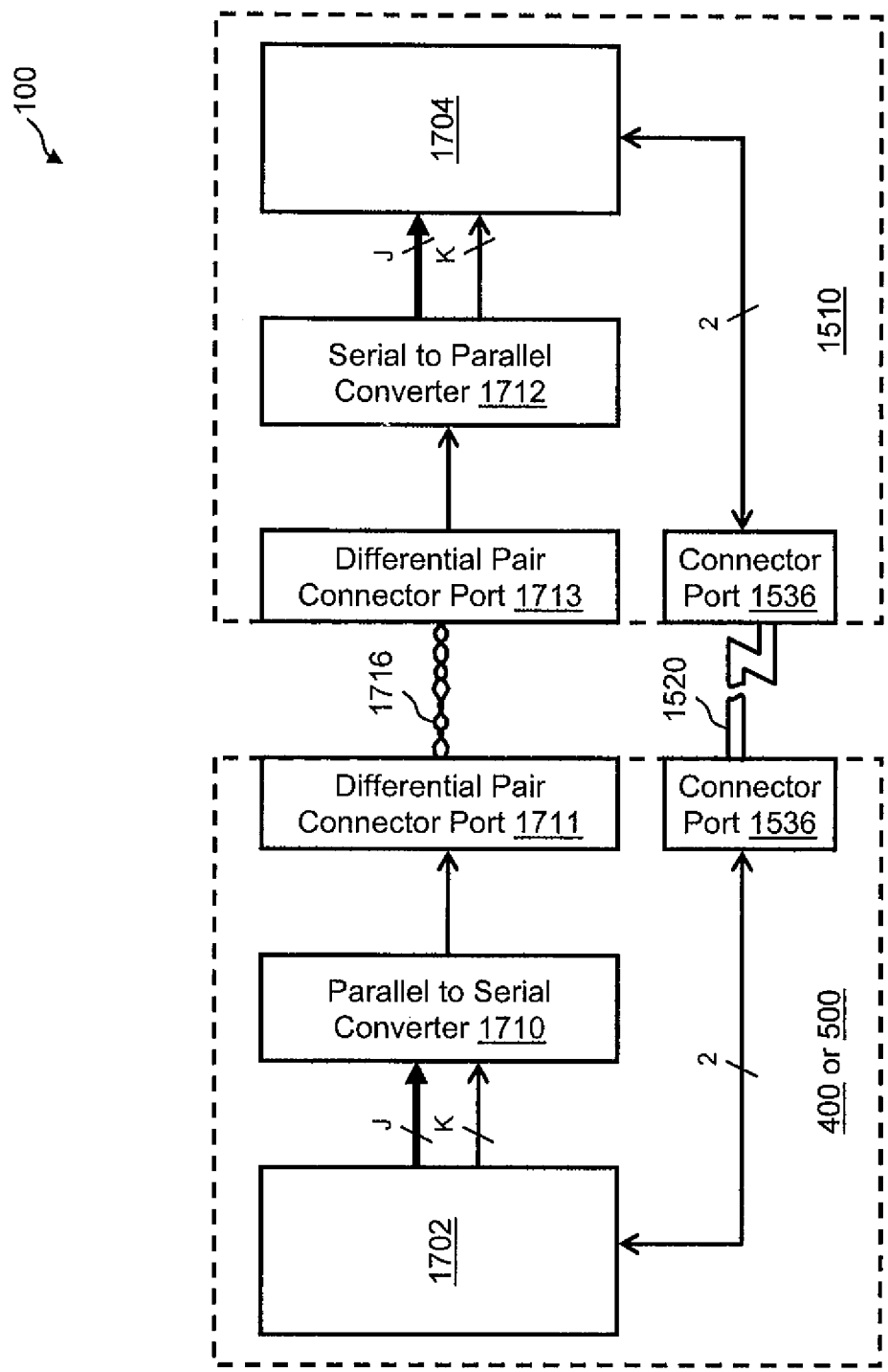

FIG. 20 is a block diagram illustrating an embodiment wherein EMI emissions are reduced with use of a different pair connector.

DETAILED DESCRIPTION OF THE INVENTION

There is described a decodable indicia reading terminal which in one embodiment can capture and process a certain (e.g., a first) and a subsequent (e.g., a second) frame of image data, wherein the certain and the subsequent frames have different imaging attributes.

In one embodiment, the imaging attributes between certain and subsequent frames are differentiated in that the certain frame represents light incident on pixels of a first image sensor and the subsequent frame of image data represents light incident on pixels of a second image sensor separate from the first image sensor. Additionally or in the alternative, the imaging attributes between certain and subsequent frames can be differentiated in that the first frame represents light incident on an image sensor under a first illumination profile and the subsequent frame represents light incident on pixels of an image sensor under a second illumination profile. In one embodiment, imaging attributes of a frame subject to decoding are maintained constant for each frame subject to processing during a time that a trigger signal remains active. In one embodiment, the certain and subsequent frames can be processed to yield partial decoding results and the partial decoding results can be combined to form a complete decoding result.

By providing subsequent frames for decoding processing that have different (varying) imaging attributes the likelihood of a successful decode during a time that a trigger signal remains active can be expected to be increased by avoidance of an occurrence wherein a succession of like attributed undecodable frames are received into a working memory and subject to processing.

In one embodiment, a terminal can include an imaging module having first and second image sensors. Further, the imaging module can have a support assembly for supporting first and second imaging lens assemblies. In one embodiment the first and second image sensors can be mounted on a common circuit board. Also, the support assembly can be a one piece support assembly. The terminal can in one embodiment include a single image sensor.

Figure 1:
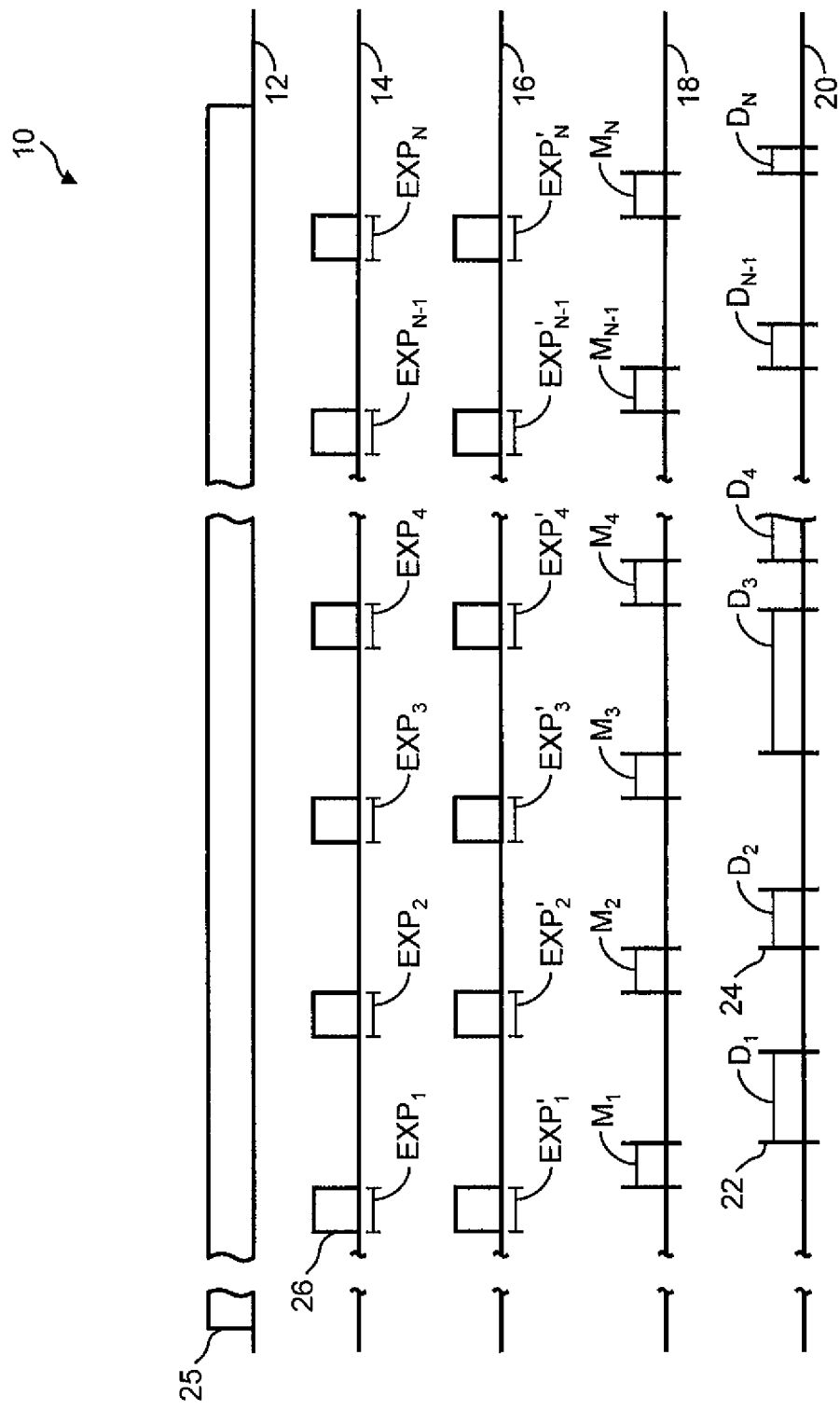
FIG. 1 is an exemplary timing diagram illustrating image data processing timing of an exemplary indicia reading terminal.

A timing diagram 10 illustrating operation of an indicia decoding terminal in one embodiment is shown in FIG. 1 and is explained with reference to the remainder of the views. Timeline 12 shows a timing diagram for a trigger signal. Terminal 100 as shown throughout various views can be adapted so that a trigger signal represented by timeline 12 can be made active e.g., by actuation of a trigger button thereon as will be described herein. A terminal can be adapted so that a trigger signal returns to an inactive state at the earliest of (a) a successful decoding of a bar code symbol, (b) a timeout condition being satisfied, or (c) a release of a trigger button. In one embodiment, terminal 100 can be adapted so that trigger signal 12 represented by timeline 12 is made active on power-up of terminal 100. For example, where terminal 100 is used as a presentation scanner, terminal 100 can be adapted so that trigger signal 12 is active for as long as terminal 100 is powered up.

Further referring to timing diagram 10, timeline 14 shows a state of an exposure control signal 14 for an image sensor of a terminal. Exposure control signal 14 changes state from an inactive to an active state. In an active state, an image sensor array of terminal 100 is exposed to light incident therein. An exposure control signal 14 can be applied to an image sensor array of terminal 100 so that pixels of an image sensor array are exposed to light during active periods of the exposure control signal and not exposed to light during inactive periods thereof. Timeline 16 shows a state of another exposure control signal for controlling exposure of a second image sensor of terminal 100 where terminal 100 includes a second image sensor. Still referring to timing diagram 10, timeline 18 shows memory fill periods of terminal 100. Timeline 18 shows periods following exposure periods wherein terminal 100 writes image data read out from an image sensor array to a working memory thereof for further processing. Timeline 18 illustrates that there is a time lag after an exposure period before terminal 100 can process memory retained image data for processing. In one embodiment, terminal 100 during successive memory fill periods can fill a memory space with image data representing light incident on different first and second image sensors. The image data of successive frames can, in addition or in the alternative, have different illumination profile imaging attributes, as will be described herein. Further referring to the timing diagram of FIG. 1, timeline 20 illustrates decoding periods of terminal 100 in an exemplary embodiment. In general, terminal 100 can be adapted to subject each new incoming frame to a decode attempt until there is a successful decode. As noted with reference to the timing diagram of FIG. 1, the decoding periods can commence when a frame of image data has been written into working memory, (i.e., decoding can commence when a frame has been received into a working memory such as memory 80, as will be described herein, and is available for processing by processor 60). It is seen generally that each frame of image data that can be processed by terminal 100 can have a corresponding exposure period. Thus, where terminal 100 is adapted so that received frames have alternating source imaging attributes, the frame of image data available for processing at time 22 might have a corresponding exposure period of $EXP_1$ and the frame of image data available for processing at time 24 might have a corresponding exposure period of exposure period $EXP_2$. The decoding periods $D_1, D_2, D_3, D_4, D_{N-1}, D_N$ can be of variable length. For example, for some frames an undecodable frame result (a result indicating that the frame cannot be decoded) can be yielded more quickly than for other frames. Between time 25 (initiation of trigger signal) and time 26 (first exposure period), terminal 100 can optionally operate in a setup mode. In a setup mode, terminal 100 can receive one or more frames and can subject such frames not to decoding processing; but to parameter determination processing for purposes of determining imaging parameters (e.g., exposure and/or gain parameters and/or other imaging parameters).

Figure 2:
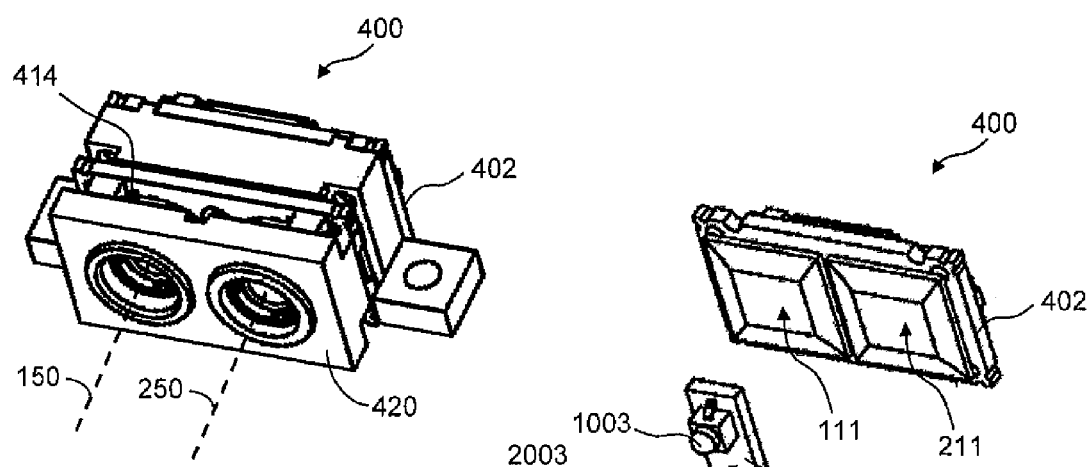
FIG. 2 is a view of an exemplary imaging module which may be incorporated in an indicia reading terminal.
Figure 3:
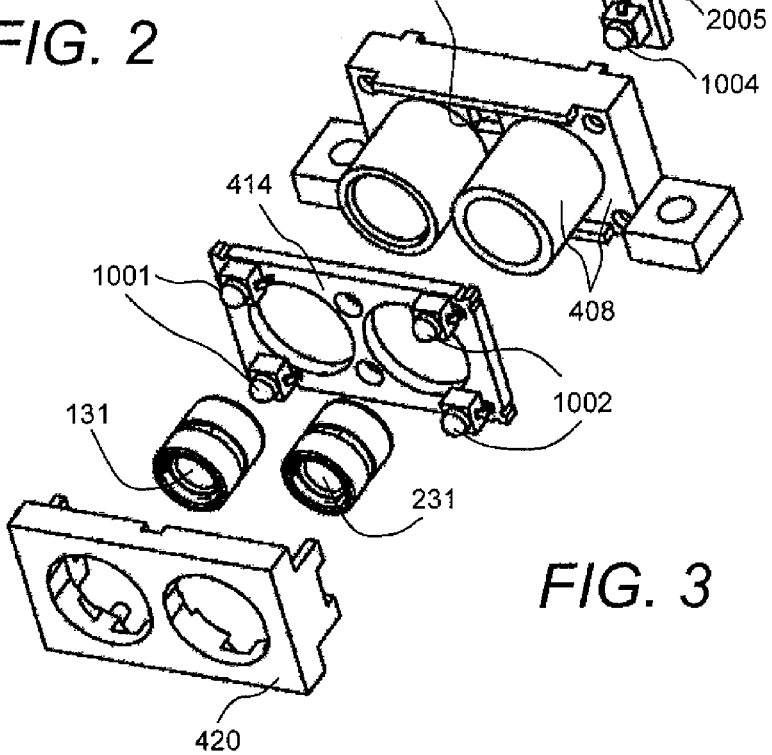
FIG. 3 is an exploded assembly view of the imaging module as shown in FIG. 2.
Figure 4:
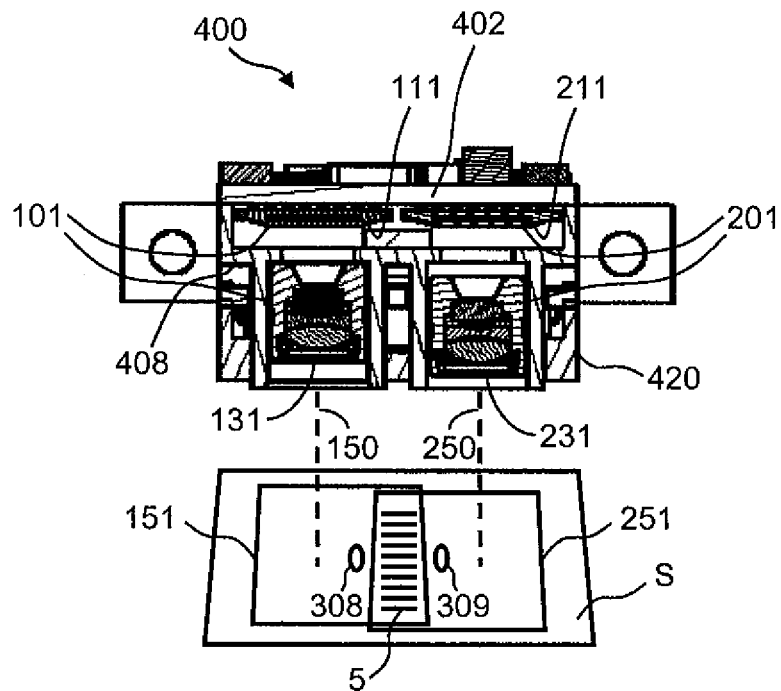
FIG. 4 is a cutaway top view of the imaging module as shown in FIG. 2.

In FIGS. 2, 3, 4, and 5, there is shown an exemplary imaging module 400 that can be incorporated in an indicia reading terminal. Imaging module 400 can include first image sensor 111, second image sensor 211, and circuit board 402. In the embodiment of FIGS. 2-4, a single circuit board; namely, circuit board 402 commonly carries both of first image sensor 111 and second image sensor 211. Positioned forward of first image sensor 111 can be first imaging lens assembly 131 and positioned forward of second image sensor 211 can be second imaging lens assembly 231. The combination of first image sensor 111 and first imaging lens assembly 131 can be regarded as a first imaging assembly 101. The combination of second image sensor 211 and second imaging lens assembly 231 can be regarded as a second imaging assembly 201. The first and second imaging assemblies can be differentiated. For example, a first imaging assembly can be adapted to have a fixed first best focus distance and a second imaging assembly can be adapted to have a fixed second best focus distance. Additionally or in the alternative, a first imaging assembly can be adapted to include a monochrome image sensor and a second imaging assembly can be adapted to include a color image sensor. Additionally or in the alternative, a first imaging assembly can be adapted to include a linear image sensor (i.e., having an N×1 or N×M, N>>M pixel array) and a second imaging assembly can be adapted to include a two dimensional image sensor having a plurality (M×N where M and N are greater than 50) of pixels formed in a plurality of rows and columns.

Table A summarizes possible differentiations between a first imaging assembly and a second imaging assembly that can be provided in various alternative embodiments.

Referring to further aspects of imaging module 400, imaging module 400 can include imaging lens assembly support assembly 408. Support assembly 408 can be a one piece element and can be adapted to carry both of first imaging lens assembly 131 and second imaging lens assembly 231. Support assembly 408 can be mounted to circuit board 402 carrying both first image sensor 111 and second image sensor 211. As best seen in FIG. 4, imaging module 400 can be adapted so that first imaging assembly 101 and second imaging assembly 201 have parallel extending imaging axes 150 and 250. Imaging axes 150 and 250 can, in the alternative, be in converging or diverging relationship. Terminal 100 incorporating imaging module 400 can be adapted so that when terminal 100 incorporating imaging module 400 is directed toward a substrate, s, (e.g., a package) carrying a decodable indicia, 5 (e.g., a bar code symbol (bar code)) such that when imaging axes 150 and 250 are both directed toward substrate, s, a first field of view 151 of first imaging assembly 101 and a second field of view 251 of second imaging assembly 201 can be in overlapping relationship with one another and can both be defined on substrate, s. When imaging axes 150, 250 are directed toward substrate s, respective fields of view 151, 251 are defined on substrate s.

While first imaging assembly 101 and second imaging assembly 201 in the embodiment of FIGS. 2-5 are shown as

TABLE A

| | Imaging Assembly 101 | | | | Imaging Assembly 201 | | | |
| --- | --- | --- | --- | --- | --- | --- | --- | --- |
| Embodiment | Best Focus Distance | FOV Angle | Color or Monochrome | Pixel Array | Best Focus Distance | FOV Angle | Color or Monochrome | Pixel Array |
| A | 7 inches | 40 degrees | Monochrome | 864 × 640 | 20 inches | 20 degrees | Monochrome | 864 × 640 |
| B | 1.5 inches | 35 degrees | Monochrome | 752 × 480 | 9 inches | 16 degrees | Monochrome | 752 × 480 |
| C | 7 inches | 35 degrees | Monochrome | 864 × 640 | Infinity | 60 degrees | Color | 864 × 640 |
| D | 5 inches | 40 degrees | Monochrome | 864 × 640 | 20 inches | 30 degrees | Monochrome | 1280 × 960 |
| E | 7 inches | 40 degrees | Color | 864 × 640 | 20 inches | 20 degrees | Color | 864 × 640 |
| F | 7 inches | 40 degrees | Monochrome | 1040 × 2 | 20 inches | 20 degrees | Color | 864 × 640 |

In any of the embodiments where there is referenced a color image sensor, the color image sensor can be a special type of color image sensor having a combination of color sensitive pixels and monochrome pixels without color filters as are described in U.S. Patent Publication No. US2006/027417 entitled, "Digital Picture Taking Optical Reader Having Hybrid Monochrome And Color Image Sensor Array," filed Jun. 30, 2005, incorporated herein by reference. Where terminal 100 incorporates an imaging module having both a color and a monochrome image sensor, and alternatingly receives and processes for decoding frames corresponding to each of the image sensors, terminal 100 can according to a configuration as indicated in Table 1 (e.g., configuration C or D) selectively activate a color processing module while processing the alternating frames. The color processing module can be selectively activated when a received frame has image data representing light on an image sensor provided by a color image sensor. The color processing module converts color image data into monochrome image data. In one embodiment where an image sensor configured a Bayer Pattern color filter, the color processing module selectively reads green pixel image data only, discards image data corresponding to red and blue pixels, and interpolates missing pixel values based on the green pixel image data.

having entirely separate components, first imaging assembly 101 and second imaging assembly 201 can have shared components. For example, the first imaging assembly 101 and second imaging assembly 201 can have common imaging lens elements and a beam splitter can be disposed in a common optical receive path of the first and second imaging assemblies for splitting received light rays and directing received light rays simultaneously to first image sensor 111 and second image sensor 211.

Referring to further aspects of imaging module 400, imaging module 400 can also include illumination circuit board 414 which carries first and second light source banks 1001 and 1002. Each of first and second light source banks 1001 and 1002, shown in the particular embodiment as having a pair of light sources, can include one or more light sources, e.g., one or more LEDs, laser diode assemblies, arc lamps, and/or other types of light sources. The light source banks can include a combination of different light source types. Illumination circuit board 414 can be fitted over support assembly 408 and can be abutted against support assembly 408. Imaging module 400 can also include first and second aiming light source banks 1003, 1004, each including one or more light sources. In the particular embodiment of FIGS. 2-5, aiming banks 1003, 1004 are each provided by a single LED, but could also comprise a different type of light source or sources. In the particular imaging module shown, imaging module 400 can include optics 2003 for directing light from aiming light source bank 1003 to a field of view 151 of first imaging assembly 101, and optics (not shown) for directing light from aiming light source bank 1004 to a field of view 251 of second imaging assembly 201. Imaging module 400 can be adapted so that the fields of view of first imaging assembly 101 and second imaging assembly 201 at least partially overlap over a range of reading distances. In the embodiment of FIGS. 2-5, the fields of view 151, 251 of first imaging assembly 101 and second imaging assembly 201 partially overlap over a range of reading distances. First and second aiming banks 1003, 1004 can be mounted on aimer circuit board 2005. Light from first light source bank 1003 can be directed to project aiming spot 308 in field of view 151, while light from second light source bank 1004 can be directed to project aiming spot 309 within field of view 251. Where the aiming spots are projected at a known angle, a distance from module 400 to substrate, s, can be determined through table lookup by detecting a position of aiming spots 308, 309 within the respective fields of view 151, 251.

Imaging module 400 can also include optical plate 420. Optical plate 420 can have a textured surface so that light emitted from first and second light source banks 1001 and 1002 is homogenized to avoid generation of "hot spots" on substrate, s.

Terminal 100, in another embodiment, can incorporate an imaging module as shown in FIGS. 6, 7, 8, and 9. Imaging module 500 can include a single image sensor 311, which, together with imaging lens assembly 331, forms imaging assembly 301. Image sensor 311 may be a linear image sensor, a two dimensional image sensor, monochrome or color. Image sensor 311 can be disposed on a circuit board 502. In another aspect a support assembly 308 for carrying imaging lens assembly 331 can be mounted to circuit board 502. Circuit board 502 can carry first bank 1001 and second bank 1002 of light sources. Each light source bank can include one or more light sources. The light sources can be of one or more light source types such as LEDs, laser diode assemblies, arc lamps, and other light source types. Imaging assembly 301 can have an imaging axis 350. Imaging module 500 can also include aiming light source bank 1003 comprising one or more light sources. The light sources can be of any of the types described herein. In the embodiment of FIGS. 6-9, an aiming illumination assembly is shown as being provided by a laser diode assembly which projects aiming spot 310 onto a substrate, s, carrying a decodable indicia 5, such as a bar code symbol. Aiming spot 310 can be projected on substrate, s, within a field of view 351 of imaging module 500. In another aspect, imaging module 500 can have an optical plate 315 comprising a textured surface for diffusing light from light source banks 1001, 1002. Where spot 310 is projected at a known angle, terminal 100 can detect a distance of module 500 to substrate, s, through table lookup by detecting a position of spot 310 within field of view 351.

Figure 10:
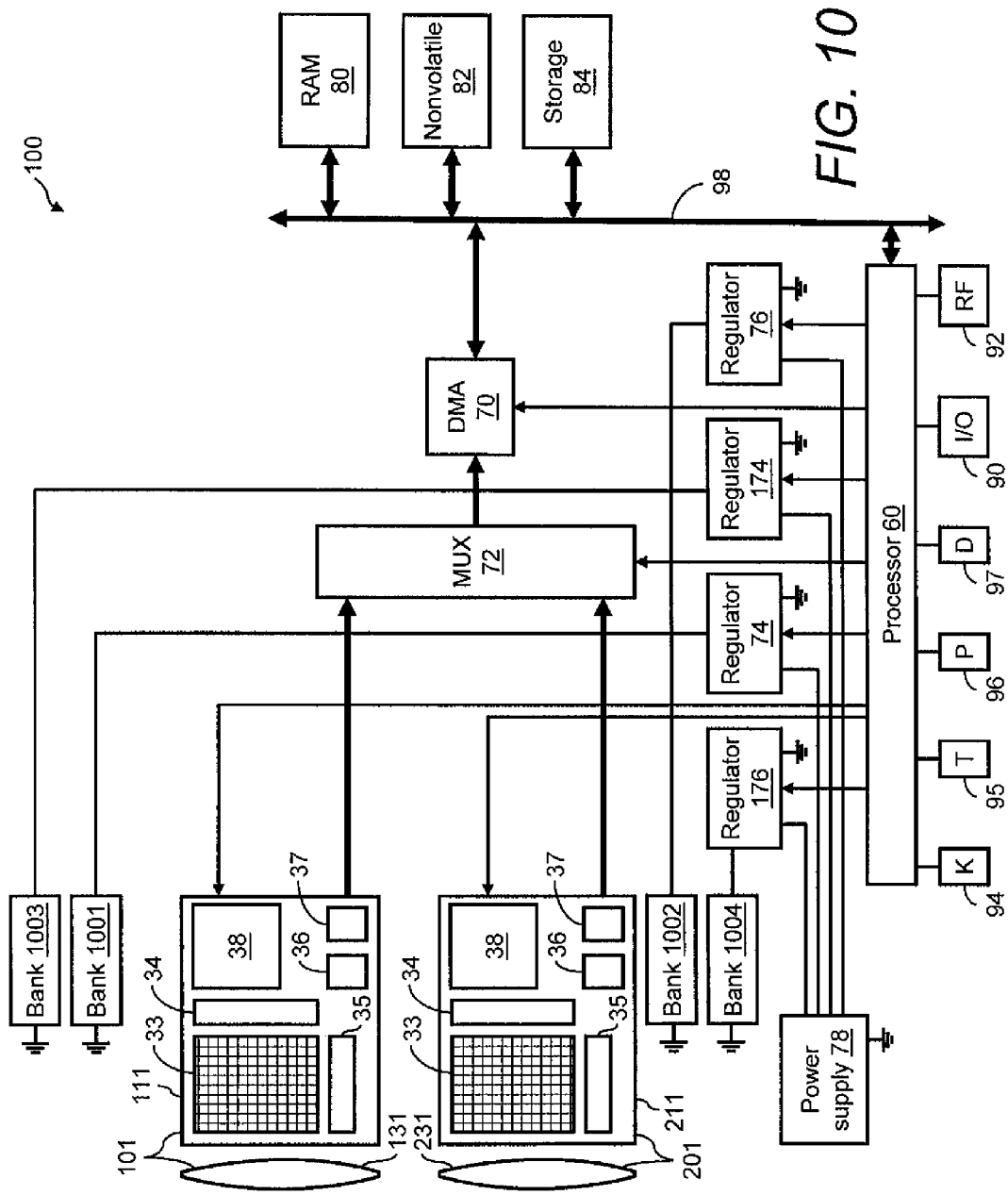
FIG. 10 is a block electrical diagram illustrating components of an indicia reading terminal in one exemplary embodiment.

In FIG. 10 there is shown an exemplary electrical circuit diagram supporting operations of terminal 100 incorporating an imaging module as shown in FIGS. 2, 3, and 4. Terminal 100 can include first image sensor 111 and second image sensor 211. Both of first image sensor 111 and second image sensor 211 can be in communication with Direct Memory Access (DMA) unit 70 via multiplexer 72. Terminal 100 can also include a processor 60. In one example, processor 60 can be provided by a general purpose CPU based microprocessor. Terminal 100 can be adapted so that in response to activation of a trigger signal, terminal 100 continuously receives (captures) frames of image data into a working memory such as memory 80 and subjects received (captured) frames of image data to decode attempts for a time that trigger signal 12 remains active. The process of receiving frames of image data and subjecting the frames of image data to a decode attempt can continue until a decoded message is determined and output. In the case of a presentation scanner, the capturing and decoding can continue uninterrupted after a first decoded message is determined and output. In one embodiment where terminal 100 includes first and second image sensors as shown in FIGS. 2-5, terminal 100 can capture frames of image data representing light incident on each of the image sensors during a time that a trigger signal is made active.

Regarding image sensor 111 and image sensor 211, each of image sensor 111 and image sensor 211 can be provided on an integrated circuit chip having an image sensor array 33, column circuitry 34, row circuitry 35, a gain block 36, an analog-to-digital converter 37, and a timing and control block 38. Image sensor array 33 can be a two dimensional image sensor array having a plurality of light sensitive pixels formed in a plurality of rows and columns. Terminal 100 can further include a processor 60, lens assemblies 131 and 231, a direct memory access (DMA) unit 70, a volatile system memory 80 (e.g., RAM), a nonvolatile system memory 82 (e.g., EPROM), a storage memory 84, a wireline input/output interface 90 (e.g., Ethernet), and an RF transceiver interface 92 (e.g., IEEE 802.11). System memory 80 can be regarded as a working memory. Terminal 100 can also include a keyboard 94, a trigger button 95, and a pointer controller 96 for input of data and for initiation of various controls and a display 97 for output of information to an operator. Terminal 100 can also include a system bus 98 providing communication between processor 60 and various components of terminal 100. DMA unit 70 can be provided by, e.g., a field programmable gate array (FPGA) or an application specific integrated circuit (ASIC). While shown as being separate units, DMA unit 70 and processor 60 can be provided on a common integrated circuit.

In response to control signals received from processor 60, timing and control circuit 38 can send image sensor array timing signals to array 33 such as reset, exposure control, and readout timing signals. After an exposure period, a frame of image data can be read out of image sensor array 33. Analog image signals that are read out of array 33 can be amplified by gain block 36 converted into digital form by analog-to-digital converter 37 and sent to multiplexer 72 which in turn routes the image data to DMA unit 70. DMA unit 70, in turn, can transfer digitized image data into volatile memory 80. Processor 60 can address frames of image data retained in volatile memory 80 for decoding of decodable indicia represented therein.

In one embodiment, processor 60 can be programmed to control the routing image data into RAM 80 for further processing. Terminal 100 can be adapted so that RAM 80 can be addressable by processor 60. Terminal 100 can be adapted so that processor 60 can address for decoding (e.g., bar code decoding) processing image data retained in a working memory of terminal 100, e.g., RAM 80. In one embodiment terminal 100 can be adapted so that terminal 100 in successive memory fill periods, alternately routes image data representing light incident on first image sensor 111 and image data representing light incident on second image sensor 211 into RAM 80 for further processing. Multiplexer 72 can be adapted so that when first switching circuitry of multiplexer 72 is active, image data output by first image sensor 111 is routed to DMA 70 for transfer to RAM 80 and can further be adapted so that when second switching circuitry of multiplexer 72 is active, image data output by second image sensor 211 is routed to DMA 70 for transfer to RAM 80. For alternating between routing of image data representing light incident on first image sensor 111 and second image sensor 211, terminal 100 can be adapted so that processor 60 intermediate of successive frame capture periods appropriately activates the mentioned switching circuitry of multiplexer 72.

Further regarding the block diagram of FIG. 10, terminal 100 can include regulator 74 for regulating the delivery of power to light source bank 1001 and regulator 76 for regulating the delivery of power to light source bank 1002. Terminal 100 can also include regulator 174 for delivery of power to aiming light source bank 1003 and regulator 176 for delivery of power to aiming light source bank 1004. For supplying power to the regulators 74, 76, 174, 176 there can be a power supply 78, which can be interfaced to various alternative power sources, e.g., a battery, an AC/DC transformer, a USB cable (not shown).

Figure 11:
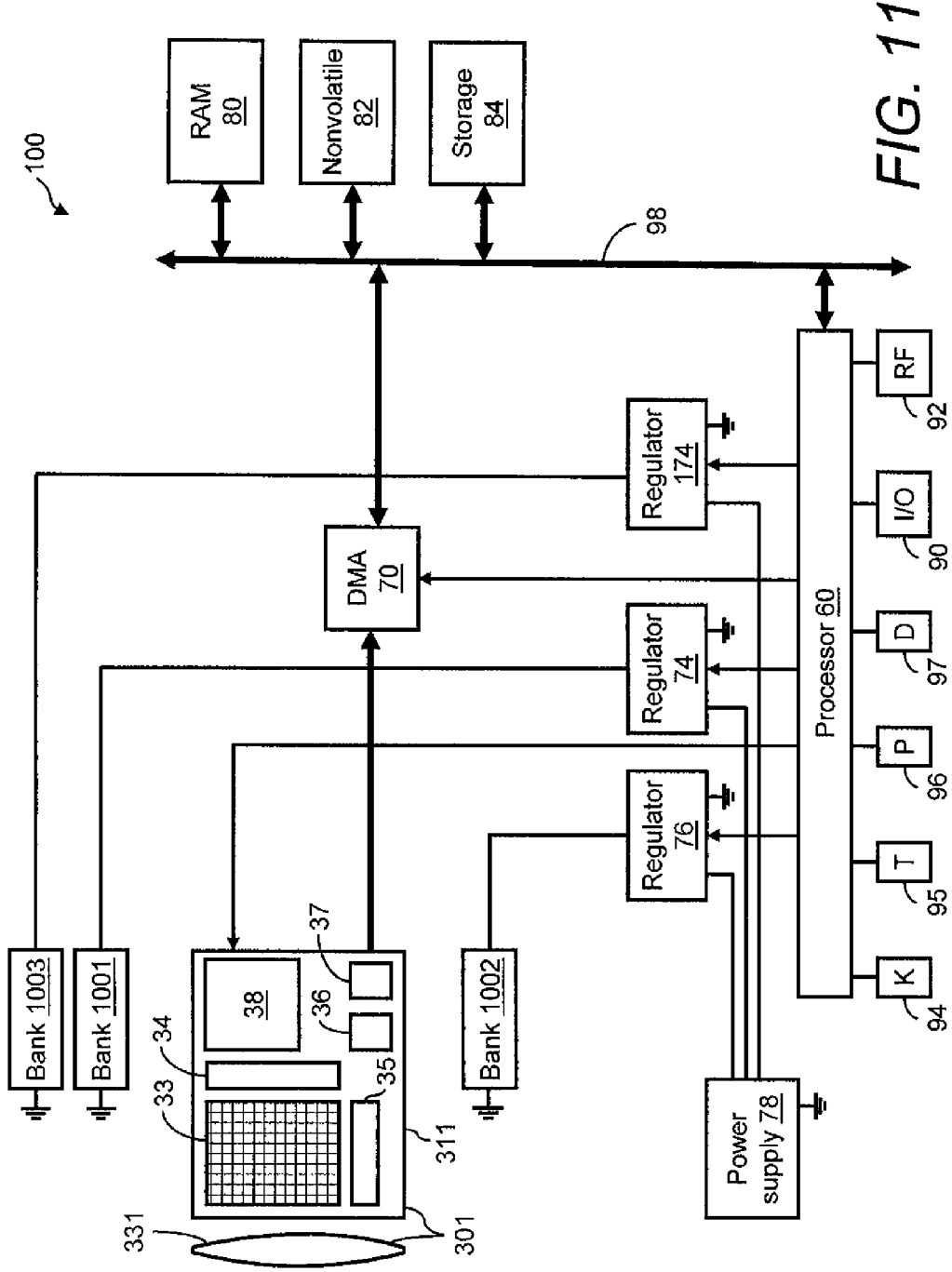
FIG. 11 is a block electrical diagram illustrating components of an indicia reading terminal in another exemplary embodiment.

Referring to FIG. 11, FIG. 11 shows an exemplary circuit diagram wherein terminal 100 includes a single image sensor 311. Shown as being provided by a two dimensional image sensor, image sensor 311 can also be a one dimensional image sensor, (an N×1 or N×M image sensor where N>>M). The circuit of FIG. 11 has the components of and operates in the manner of the circuit of FIG. 10 except that multiplexer 72 is deleted and for each successive memory fill period of a succession of memory fill periods processor 60 routes into memory 80 image data generated by and representing light incident on single image sensor 311. Aiming light source bank 1004 and its associated regulator 176 are also deleted in the specific embodiment of FIG. 11. Imaging module 400 and imaging module 500 can include fixed optics defining a fixed focal length and best focus distance for each imaging assembly of imaging module 400 or imaging module 500. Alternatively, imaging modules for incorporation in terminal 100 can include multiple setting lenses as are described in the attachment entitled, "Indicia Reading Terminal Having Multiple Setting Imaging Lens," attached hereto as Appendix A.

In one embodiment, terminal 100 is adapted so that during successive memory fill periods terminal 100 receives into memory 80 frames of image data having different imaging attributes. The different imaging attributes can be attributes relating to image source (the imaging assembly out of a set of possible imaging assemblies which generated the image data in the form of image signals) and/or attributes relating to imaging profile (the set of terminal light sources energized during a certain frame's corresponding exposure period).

In Table 1 there is presented an exemplary set of configurations for terminal 100 when terminal 100 includes a plurality of image sensors, e.g., image sensor 111, 211 and where terminal 100 is capable of varying a source imaging attribute between successive frames of image data. In one embodiment, the configurations can be manually selectable. In another embodiment, the configurations can, in addition or in the alternative, be automatically selectable responsively to a sensed condition. Terminal 100 can also be adapted so that terminal 100 can dynamically switch configurations while a trigger signal is active. For example, terminal 100 can be adapted so that terminal 100, after a trigger signal is made active, commences operation according to a first configuration and switches operation to a new configuration while the trigger signal remains active. Terminal 100 can be adapted so that such switching is responsive to a sensed condition, e.g., the distance of an imaging module to a substrate, s, or an inability of terminal 100 to decode a decodable indicia (e.g., which may be determined by determining that successive frames of image data cannot be decoded).

TABLE 1

| CONFIGURATION | FRAMES | | | | | |
| --- | --- | --- | --- | --- | --- | --- |
| | 1 | 2 | 3 | 4 | 5 | 6 |
| A | Source Imaging Assembly 101 Illumination Profile 1001 On 1002 On | Source Imaging Assembly 101 Illumination Profile 1001 On 1002 On | Source Imaging Assembly 101 Illumination Profile 1001 On 1002 On | Source Imaging Assembly 101 Illumination Profile 1001 On 1002 On | Source Imaging Assembly 101 Illumination Profile 1001 On 1002 On | Source Imaging Assembly 101 Illumination Profile 1001 On 1002 On |
| B | Source Imaging Assembly 201 Illumination Profile 1001 On 1002 On | Source Imaging Assembly 201 Illumination Profile 1001 On 1002 On | Source Imaging Assembly 201 Illumination Profile 1001 On 1002 On | Source Imaging Assembly 201 Illumination Profile 1001 On 1002 On | Source Imaging Assembly 201 Illumination Profile 1001 On 1002 On | Source Imaging Assembly 201 Illumination Profile 1001 On 1002 On |
| C | Source Imaging Assembly 101 Illumination Profile 1001 On 1002 On | Source Imaging Assembly 201 Illumination Profile 1001 On 1002 On | Source Imaging Assembly 101 Illumination Profile 1001 On 1002 On | Source Imaging Assembly 201 Illumination Profile 1001 On 1002 On | Source Imaging Assembly 101 Illumination Profile 1001 On 1002 On | Source Imaging Assembly 201 Illumination Profile 1001 On 1002 On |
| D | Source Imaging Assembly 101 Illumination Profile 1001 On 1002 On | Source Imaging Assembly 101 Illumination Profile 1001 On 1002 On | Source Imaging Assembly 101 Illumination Profile 1001 On 1002 On | Source Imaging Assembly 201 Illumination Profile 1001 On 1002 On | Source Imaging Assembly 201 Illumination Profile 1001 On 1002 On | Source Imaging Assembly 201 Illumination Profile 1001 On 1002 On |

TABLE 1-continued

| | | | | | | |
|---|---|---|---|---|---|---|
| E | Source Imaging Assembly 101 Illumination Profile 1001 Off 1002 On | Source Imaging Assembly 201 Illumination Profile 1001 On 1002 Off | Source Imaging Assembly 101 Illumination Profile 1001 Off 1002 On | Source Imaging Assembly 201 Illumination Profile 1001 On 1002 Off | Source Imaging Assembly 101 Illumination Profile 1001 Off 1002 On | Source Imaging Assembly 201 Illumination Profile 1001 On 1002 Off |
| F | Source Imaging Assembly 101 Illumination Profile 1001 Off 1002 On | Source Imaging Assembly 101 Illumination Profile 1001 Off 1002 On | Source Imaging Assembly 101 Illumination Profile 1001 Off 1002 On | Source Imaging Assembly 101 Illumination Profile 1001 Off 1002 On | Source Imaging Assembly 201 Illumination Profile 1001 On 1002 Off | Source Imaging Assembly 201 Illumination Profile 1001 On 1002 Off |
| G | Source Imaging Assembly 101 Illumination Profile 1001 On 1002 On | Source Imaging Assembly 201 Illumination Profile 1001 On 1002 On | Source Imaging Assembly 101 Illumination Profile 1001 On 1002 On | Source Imaging Assembly 201 Illumination Profile 1001 On 1002 On | Source Imaging Assembly 101 Illumination Profile 1001 On 1002 On | Source Imaging Assembly 201 Illumination Profile 1001 On 1002 On |
| H | Source Imaging Assembly 201 Illumination Profile 1001 Off 1002 Off | Source Imaging Assembly 201 Illumination Profile 1001 Off 1002 Off | Source Imaging Assembly 201 Illumination Profile 1001 Off 1002 Off | | | |
| I | Source Imaging Assembly 201 Illumination Profile 1001 Off 1002 Off | Source Imaging Assembly 201 Illumination Profile 1001 Off 1002 Off | Source Imaging Assembly 201 Illumination Profile 1001 Off 1002 Off | Source Imaging Assembly 201 Illumination Profile 1001 Off 1002 Off | Source Imaging Assembly 201 Illumination Profile 1001 Off 1002 Off | Source Imaging Assembly 201 Illumination Profile 1001 Off 1002 Off |

| | | FRAMES | | | |
|---|---|---|---|---|---|
| CONFIGURATION | 7 | 8 | 9 | 10 | ... |
| A | Source Imaging Assembly 101 Illumination Profile 1001 On 1002 On | Source Imaging Assembly 101 Illumination Profile 1001 On 1002 On | Source Imaging Assembly 101 Illumination Profile 1001 On 1002 On | Source Imaging Assembly 101 Illumination Profile 1001 On 1002 On | ... |
| B | Source Imaging Assembly 201 Illumination Profile 1001 On 1002 On | Source Imaging Assembly 201 Illumination Profile 1001 On 1002 On | Source Imaging Assembly 201 Illumination Profile 1001 On 1002 On | Source Imaging Assembly 201 Illumination Profile 1001 On 1002 On | ... |
| C | Source Imaging Assembly 101 Illumination Profile 1001 On 1002 On | Source Imaging Assembly 201 Illumination Profile 1001 On 1002 On | Source Imaging Assembly 101 Illumination Profile 1001 On 1002 On | Source Imaging Assembly 201 Illumination Profile 1001 On 1002 On | ... |
| D | Source Imaging Assembly 101 Illumination Profile 1001 On 1002 On | Source Imaging Assembly 101 Illumination Profile 1001 On 1002 On | Source Imaging Assembly 101 Illumination Profile 1001 On 1002 On | Source Imaging Assembly 201 Illumination Profile 1001 On 1002 On | ... |

TABLE 1-continued

| | | | | | |
|---|---|---|---|---|---|
| E | Source Imaging Assembly 101 Illumination Profile 1001 Off 1002 On | Source Imaging Assembly 201 Illumination Profile 1001 On 1002 Off | Source Imaging Assembly 101 Illumination Profile 1001 Off 1002 On | Source Imaging Assembly 201 Illumination Profile 1001 On 1002 Off | ... |
| F | Source Imaging Assembly 201 Illumination Profile 1001 On 1002 Off | Source Imaging Assembly 201 Illumination Profile 1001 On 1002 Off | Source Imaging Assembly 101 Illumination Profile 1001 Off 1002 On | Source Imaging Assembly 101 Illumination Profile 1001 Off 1002 On | ... |
| G | Source Imaging Assembly 101 Illumination Profile 1001 Off 1002 On | Source Imaging Assembly 201 Illumination Profile 1001 On 1002 Off | Source Imaging Assembly 101 Illumination Profile 1001 Off 1002 On | Source Imaging Assembly 201 Illumination Profile 1001 On 1002 Off | ... |
| H | | | | | ... |
| I | Source Imaging Assembly 201 Illumination Profile 1001 Off 1002 Off | Source Imaging Assembly 201 Illumination Profile 1001 Off 1002 Off | Source Imaging Assembly 201 Illumination Profile 1001 Off 1002 Off | Source Imaging Assembly 201 Illumination Profile 1001 Off 1002 Off | ... |

Referring to Configuration A, terminal 100, when operating according to Configuration A, receives image data representing light on pixels of an image sensor of first imaging assembly 101 and does not receive image data representing light incident on image sensor pixels of second image sensor 201. Terminal 100, when operating according to Configuration B, receives image data representing light incident on image sensor pixels of second imaging assembly but does not receive image data representing light incident on first image sensor. An operator might select Configuration A where, for example, terminal 100 will be used only for short range bar code reading and first imaging assembly 101 is optimized for short range reading. An operator might select Configuration B wherein, for example, terminal 100 will be used in a present application only for long range reading and where second imaging assembly 201 is optimized for long range reading.

Referring to Configuration C, terminal 100, when operating in Configuration C, alternates between processing frames of image data having a source imaging attribute of first imaging assembly 101 and frames of image data having a source imaging attribute of second imaging assembly 201. In Configuration C, the illumination profile is the same for each frame. In the specific example of Configuration C, each of first light source bank 1001 and second light source bank 1002 is energized for the exposure period corresponding to each incoming frame subject to processing. An operator might select Configuration C where, for a present application, terminal 100 will be used to read decodable indicia a range of distances between a terminal 100 substrate on which a decodable indicia (e.g., a bar code) is disposed.

Configuration D is similar to Configuration C except that in Configuration D, terminal 100 maintains imaging attributes for a plurality of successively received frames at constant values before changing to new attributes values.

Referring to Configuration E, terminal 100, when operating according to Configuration E, varies the source attribute and illumination profile attribute of incoming frames subject to processing. Note, for example, that for frame 1, according to Configuration E, a source attribute is first imaging assembly 101 and the illumination profile is an illumination profile wherein light source bank 1002 is energized and light source bank 1001 is not energized. For frame 2, according to Configuration E, a source attribute is second imaging assembly 201 and the illumination profile is the profile wherein bank 1001 is energized for the exposure period corresponding to frame 2 and bank 1002 is not energized for the exposure period for frame 2. An operator may select Configuration E where it is possible that terminal 100 may encounter specular reflection read failures conditions. Terminal 100 may encounter a specular reflection read error where light emitted to terminal 100 is reflected substantially entirely back to terminal 100 so as to saturate the pixels of a terminal image sensor. In general, it is possible to reduce the occurrence of saturation conditions by differentiating an angle of incident illumination relative to an angle of received light rays. Referring to Configuration E it is noted that the illumination profile of each frame is characterized by offset illumination so as to create a substantial angle between incident and receive light rays. Specifically where imaging assembly 101 having image sensor 111 is the source, light source bank 1002 forming part of an illumination assembly that emits light rays closer in proximity to image sensor 211 than image sensor 111 is energized during a corresponding exposure period and light source bank 1002 is not energized. Similarly, where imaging assembly 201 having image sensor 211 as the source, light source bank 1001 forming part of an illumination assembly that emits light rays closer in proximity to image sensor 111 than image sensor 211 is energized during a corresponding exposure period and light source bank 1002 is not energized. An operator might select Configuration E, if it expected that specular reflection read conditions will be encountered.

Regarding Configuration F, Configuration F is similar to Configuration E except that terminal 100 is adapted to receive a plurality of commonly attributed frames prior to receiving a frame having a new set of imaging attributes.

Referring to Configuration G, Configuration G is similar to Configuration E except that for the first K frames (in the example K=6) the illumination profile is characterized by full illumination such that light source bank 1001 and light source bank 1002 are both energized during the exposure periods for each frame. However, when operating according to Configuration G, terminal 100, after processing a predetermined number of frames without successfully decoding a message, switches to a mode wherein terminal 100 alternately receives and processes frames of image data having variable attributes. In the example of Configuration G, terminal 100, after frame 6 receives frames having varying attributes. Specifically, after frame 6 terminal 100 receives frames having illumination profiles so as to provide offset illumination as described in Configuration E. According to Configuration G, terminal 100 immediately after a trigger signal is made active receives and processes a series of frames having full illumination profiles until a timeout is realized. When a timeout is realized (i.e., after frame 6 in the example), terminal 100 responsively switches to a mode wherein terminal 100 receives and processes frames of image data having offset illumination profiles. Thus, according to Configuration G, terminal 100 attempts to decode using full illumination and automatically switches to an offset illumination mode if decoding is unsuccessful. In the example of Configuration G, it is seen that terminal 100 receives frames of image data having more than two different imaging attribute sets during the time that trigger signal 12 remains active. Specifically, frames 1, 3, 5 have a first attribute set (full illumination, source 101), frames 2, 4, 6 have a second attribute set (full illumination, source 201), frames 7, 9 have a third attribute set (1002 on, 1001 off, source 101), and frames 8, 10 have a fourth attribute set (1002 off, 1001 on, source 201).

With further reference to the configurations of Table 1, Configuration H is an exemplary still image picture taking configuration. Terminal 100 can be adapted so that in a still image picture taking configuration, terminal 100 may capture a limited number of frames, e.g., 1 to J frames responsively to a trigger signal being made active. In the specific embodiment, terminal 100 captures three frames responsively to a trigger signal being made active in the still image picture taking configuration, and averages the frames for noise reduction prior to outputting a still image frame.

Configuration I illustrates an exemplary motion video collection configuration. Terminal 100 can be adapted so that responsively to a trigger signal being made active in a motion video collection configuration, terminal 100 captures a plurality of frames in succession, and formats the frames into a motion video file format for storage and later viewing and/or into a live streaming video format for live viewing.

It is seen with reference to Table 1 that when in a still image picture taking configuration or in a motion video configuration, a source imaging assembly can remain constant through the time the trigger signal remains active, and can be the imaging assembly of the imaging module having a longer best focus distance than remaining imaging assemblies of the module. When operating in Configuration H (still image picture taking) or Configuration I (motion video), terminal 100, in one embodiment, avoids subjecting captured frames of image data to decode attempts. Also, in an embodiment summarized in Table 1, terminal 100 can avoid energizing for energy conservation purposes light source bank 1001 and light source bank 1002 when operating in accordance with Configuration I or H (in some embodiments, light from banks 1001, 1002 may have little effect when terminal 100 is disposed at a substantial distance from a target while being used for picture taking or motion video).

Referring now to Table 2, a set of possible configurations for terminal 100 where terminal 100 has or is utilizing a single image sensor is shown and described. In the various configurations shown in Table 2, terminal 100 is capable of varying imaging attributes of successively received frames by varying an illumination profile of terminal 100 between frames.

When operating according to Configuration M, each frame received and processed by terminal 100 has a full illumination profile wherein each of light source bank 1001 and light source bank 1002 is energized during the exposure period corresponding to each received frame.

TABLE 2

| CONFIGURATION | FRAMES | | | | | |
| --- | --- | --- | --- | --- | --- | --- |
| | 1 | 2 | 3 | 4 | 5 | 6 |
| M | Illumination Profile 1001 On 1002 On | Illumination Profile 1001 On 1002 On | Illumination Profile 1001 On 1002 On | Illumination Profile 1001 On 1002 On | Illumination Profile 1001 On 1002 On | Illumination Profile 1001 On 1002 On |
| N | Illumination Profile 1001 On 1002 Off | Illumination Profile 1001 Off 1002 On | Illumination Profile 1001 On 1002 Off | Illumination Profile 1001 Off 1002 On | Illumination Profile 1001 On 1002 Off | Illumination Profile 1001 Off 1002 On |
| O | Illumination Profile 1001 On 1002 Off | Illumination Profile 1001 On 1002 Off | Illumination Profile 1001 On 1002 Off | Illumination Profile 1001 Off 1002 On | Illumination Profile 1001 Off 1002 On | Illumination Profile 1001 Off 1002 On |
| P | Illumination Profile 1001 On 1002 On | Illumination Profile 1001 On 1002 On | Illumination Profile 1001 On 1002 On | Illumination Profile 1001 On 1002 On | Illumination Profile 1001 On 1002 Off | Illumination Profile 1001 Off 1002 On |

TABLE 2-continued

| CONFIGURATION | FRAMES | | | | |
|---|---|---|---|---|---|
| | 7 | 8 | 9 | 10 | ... |
| M | Illumination Profile 1001 On 1002 On | Illumination Profile 1001 On 1002 On | Illumination Profile 1001 On 1002 On | Illumination Profile 1001 On 1002 On | ... |
| N | Illumination Profile 1001 On 1002 Off | Illumination Profile 1001 Off 1002 On | Illumination Profile 1001 On 1002 Off | Illumination Profile 1001 Off 1002 On | ... |
| O | Illumination Profile 1001 On 1002 Off | Illumination Profile 1001 On 1002 Off | Illumination Profile 1001 On 1002 Off | Illumination Profile 1001 Off 1002 On | ... |
| P | Illumination Profile 1001 On 1002 Off | Illumination Profile 1001 Off 1002 On | Illumination Profile 1001 On 1002 Off | Illumination Profile 1001 Off 1002 On | ... |

When operating according to Configuration N, terminal 100 alternates between receiving and processing frames having a first illumination profile and a second illumination profile wherein the first illumination profile is characterized by light source bank 1001 being energized during a corresponding exposure period and light source bank 1002 being de-energized. The second illumination profile is characterized by light source bank 1002 being energized during a corresponding exposure period and light source bank 1001 being de-energized. While operating in accordance with Configuration N, a likelihood of specular reflection read errors (including failures) can be expected to be reduced relative to a likelihood of read errors in Configuration M. Where terminal 100 is being held at such position that emitted light from one of light source bank 1001 or light source bank 1002 is being reflected substantially directly back at image sensor 311 to saturate image sensor 311 operating in Configuration N assures that frames can be received that were exposed during exposure periods without the particular light source bank (1001 or 1002) providing specularly reflected light being energized. When operating in Configuration N or another configuration described herein when an attribute set is changed between frames, switching an attribute set between frames may not actually remove a saturated region (a grouping of pixel locations having peak or near peak pixel intensity values) from a frame that is received and subject to processing; but rather, may change the location of the saturated region. Changing the location of a saturated region may, nevertheless, render a decodable indicia decodable in at least two ways. For example, if the saturated region is moved to a location away from a representation of decodable indicia, the decodable indicia may be rendered decodable. Also, if a saturated region is moved to a different location of a decodable indicia representation in the form of a certain type of bar code symbol, the symbol may be rendered decodable by combining a part of partial decoding results determined by attempting to decode each of the frames. An operator may select Configuration N where specular reflection (saturation) read conditions are expected to be encountered. Regarding Configuration O, Configuration O is similar to Configuration N except than in Configuration O, terminal 100 receives and processes a plurality of frames having a first set of attributes prior to receiving and processing a plurality of frames having a second set of attributes.

Regarding Configuration P, Configuration P is similar to Configuration N except terminal 100 is adapted to receive a plurality of commonly attributed frames prior to switching to a mode in which a differently attributed frame is received. In the example described, frames 1-4 have common full illumination profiles. After frame 4, the illumination profiles are characterized by one or the other light source (but not both) of illumination light source banks being on during the frame's corresponding exposure period.

When operating in Configuration P, terminal 100, after a trigger signal is made active can receive and process a predetermined number of frames having a "full illumination" (both light source banks 1001 and 1002 on) illumination profile and then if a decoded message is not determined prior to a time out period, can switch to a mode in which terminal 100 alternately receives frames of image data having first and second illumination profiles as described in connection with the description of Configuration N. When Configuration P is made active, terminal 100 is adapted to decode under specular reflection read error (saturation) conditions but is provisioned so that terminal 100 processes several frames having a full illumination profile prior to switching operation into a mode wherein different light source banks 1001 and 1002 are selectively energized during subsequent exposure periods.

It has been described that terminal 100 can subject received frames to decoding processing. In subjecting a frame of image data to decoding processing, terminal 100 can attempt to decode a decodable indicia, e.g., a bar code symbol or an OCR character. For example, in attempting to decode a 1D bar code symbol represented in a frame of image data, processor 60 can execute the following processes. First, processor 60 can launch a scan line in a frame of image data, e.g., at a center of a frame, or a coordinate location determined to include a decodable indicia representation. Next, processor 60 can perform a second derivative edge detection to detect edges. After completing edge detection, processor 60 can determine data indicating widths between edges. Processor 60 can then search for start/stop character element sequences and if found, derive element sequence characters character by character by comparing with a character set table. For certain symbologies, processor 60 can also perform a checksum computation. If processor 60 successfully determines all characters between a start/stop character sequence and successfully calculates a checksum (if applicable), processor 60 can output a decoded message. When outputting a decoded message, processor 60 can one or more of (a) initiate transfer of the decoded message to an external device, (b) initiate display of a decoded message on a display of terminal 100, (c)

attach a flag to a buffered decoded message determined by processor 60, and (d) write the decoded message to an address on long term memory, e.g., 82 and/or 84. At the time of outputting a decoded message, processor 60 can send a signal to an acoustic output device of terminal 100 (not shown) to emit a beep.

In attempting to decode a decodable symbol, terminal 100 can, in some cases, determine a set of code words of a bar code symbol. Code words of a bar code symbol are not complete decoded messages of a bar code symbol but can be combined with other code words of a bar code symbol to provide a complete decoded message. A decoded code word of a bar code symbol may be regarded as a partially decoded message. Symbologies which may be decoded to provide code words representing a partial decoded message of a bar code symbol include PDF 417, UPC, Datamatrix, QR code, and Aztec, etc.

In decoding certain symbologies, terminal 100 can be adapted to combine partial decoded out results determined from two or more different frames. A partial decode result provided by decoding a frame of image data can take the form of a set of code words. Terminal 100 can be adapted to determine a first set of code words by processing a certain frame of a set of frames received while a trigger signal is active and to combine the first set of code words with a second set of code words determined by processing of a subsequent frame while the trigger signal remains active. In one embodiment, terminal 100 can be adapted so that terminal 100 can process a certain frame to determine a first set of code words, a subsequent frame to provide a second set of code words, and a further subsequent frame to provide a third set of code words. Terminal 100 can further be adapted to combine the first, second, and third set of code words to provide a decoded message. For example, with reference to a configuration described with reference to Table 1 or 2, terminal 100 may process frame 1 to determine a first set of code words and then process frame 2 to determine a second set of code words and then combine the code words to provide a decoded message.

Regarding the terms "certain frame," "subsequent frame," and "further subsequent frame," frames 1, 2, and 3 in any of the Configurations described in Tables 1 and 2 are examples of "certain subsequent" and "further subsequent frames." Frames 1, 4 and 9 are also examples of frames that may be designated as a "certain frame," "subsequent frame," and a "further subsequent frame," as well as frames 2, 3 and 7 and so forth.

Figure 12:
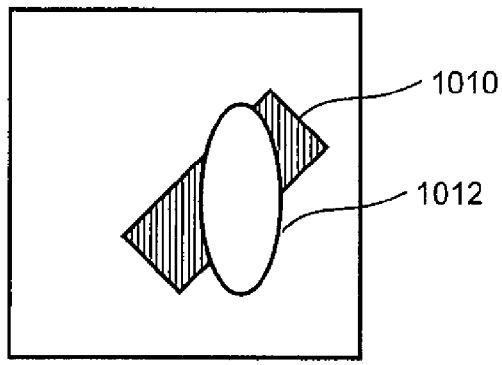
FIG. 12 is an exemplary illustration of certain and subsequent frames having different imaging attributes.
Figure 12:
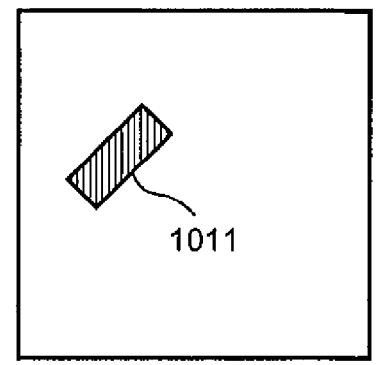
Figure 13:
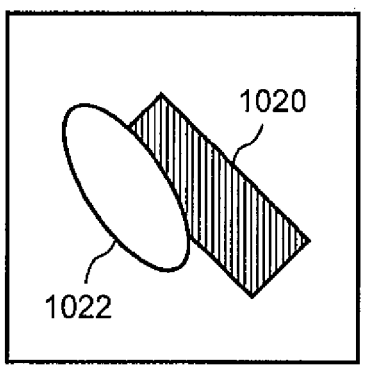
FIG. 13 is another exemplary illustration of certain and subsequent frames having different imaging attributes.
Figure 13:
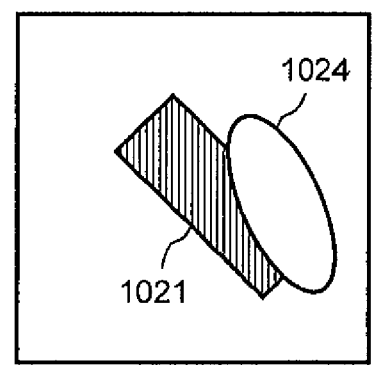

For further describing operation of terminal 100 in one embodiment, FIGS. 12 and 13 describe exemplary certain and subsequent frames of image data that may be received and subjected to processing by terminal 100. FIG. 12 shows exemplary certain and subsequent frames where the frames have different source imaging attributes, and possibly different illumination profile imaging attributes. It is seen that the subsequent frame of FIG. 12 may have a larger field of view than the certain frame and accordingly representation 1011 therein of a certain indicia may be represented with a smaller percentage of frame pixel values than the representation 1010 of the certain indicia in the certain frame. It is further seen with reference to FIG. 12 that while the certain frame may have a saturation region 1012 preventing decoding representation 1010 corresponding to the certain indicia, the subsequent frame may be devoid of a saturation region. With the certain frame having saturation region 1012 coincident with the indicia representation 1010 and with the subsequent frame being devoid of a saturation region, a subjecting of the certain frame to a decode attempt may result in a determination that the indicia corresponding to representation 1010 cannot be decoded and a subjecting of the subsequent frame to a decode attempt may result in a successful decode (a decoded message corresponding to the certain indicia being determined and output).

FIG. 13 shows exemplary certain and subsequent frames where the frames have different illumination profiles but a common source attribute. The frames have common source and accordingly as expected, the indicia representations 1020, 1021 of the frames corresponding to a certain decodable indicia have substantially the same size and position between the certain and subsequent frames. Regarding the certain frame, the certain frame has a saturation region 1022 coincident with a first part of representation 1020 representing a first part of a certain indicia. Regarding the subsequent frame, the subsequent frame also has a saturation region 1024; however, the position of the saturation region is shifted relative to the position of saturation region 1022 as a result of the different illumination profile of the subsequent frame. Regarding representation 1020, representation 1020 can be subject to a decoding processing decode attempt to provide a first set of code words representing a partial decoding result and representation 1021 of a subsequent frame can be subject to a decoding processing decode attempt to determine a second set of code words also representing a partial decoding result. Terminal 100 can combine the first set of code words and the second set of code words to provide a decoded message corresponding to the indicia commonly represented by representation 1020 and representation 1021 of the certain and subsequent frames.

Figure 14:
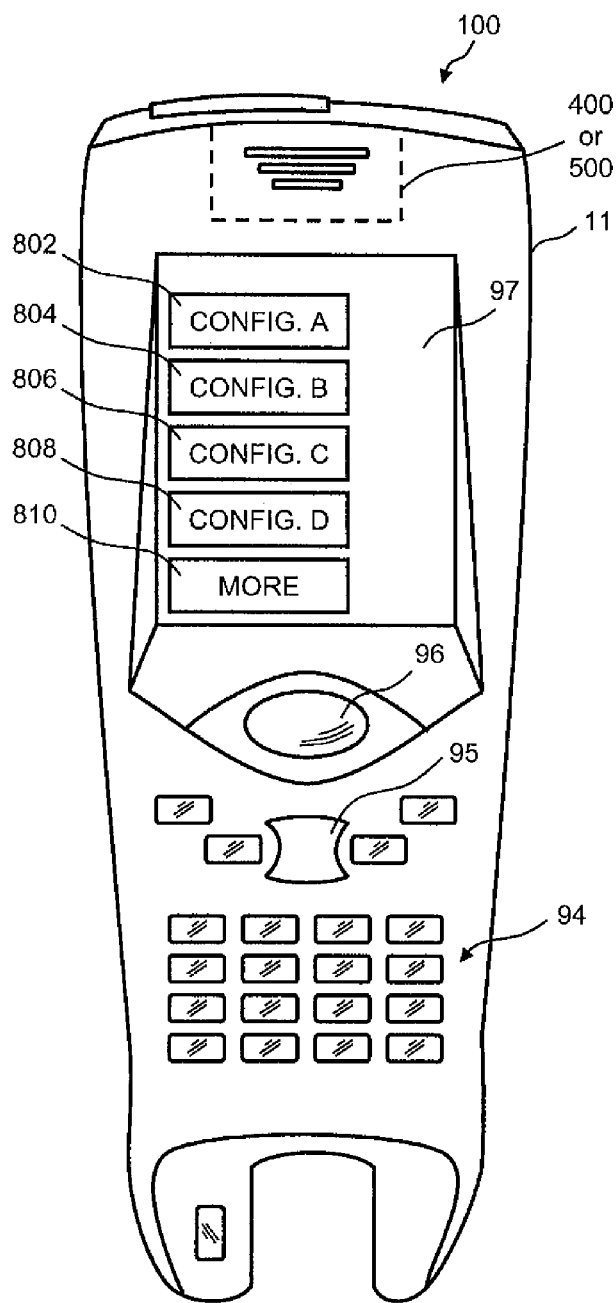
FIG. 14 shows an exemplary embodiment of a housing for an indicia reading terminal for supporting internal components thereof.
Figure 15:
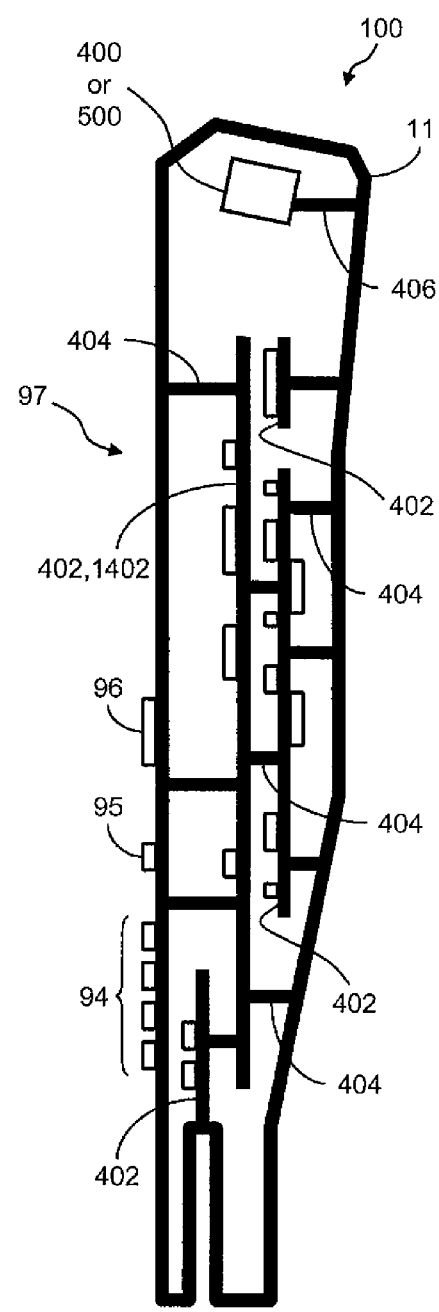
FIG. 15 shows another exemplary embodiment of a housing for an indicia reading terminal for supporting internal components thereof.

Terminal components illustrated in FIGS. 10 and 11 can be incorporated in and supported by a hand held housing. An exemplary hand held housing for supporting terminal components is shown and described in FIG. 14 and FIG. 15. As seen in FIG. 15, a plurality of circuit boards 402 including motherboard 1402 can be supported on struts 404 extending from interior walls of housing 11. An imaging module such as imaging module 400 or 500 can be incorporated in and can be supported by housing 11, specifically by supports 406 extending from an interior wall of housing 11. As indicated, terminal 100 can be adapted so that the configurations described in Table 1 and Table 2 are manually user selectable. For example, terminal 100 can include graphical user interface displays buttons 802, 804, 806, 808 corresponding to several of the configuration options ("more" button 810 can be actuated to access additional buttons corresponding to additional configurations). An operator can manually select a designated configuration by actuating (e.g., "clicking on") a button corresponding to the desired configuration. In FIG. 14, display 97 is shown as displaying Configurations A-D. Terminal 100 can be adapted to display buttons corresponding to any configuration described herein, including those described in Table 1 and Table 2.

Figure 5:
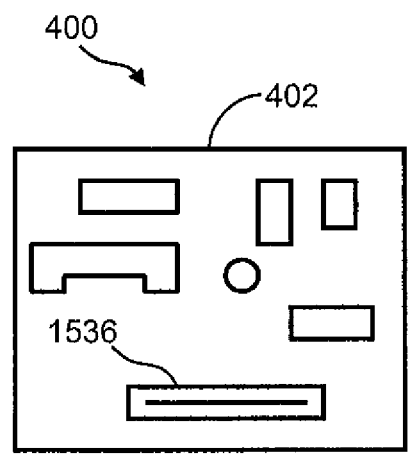
FIG. 5 is a rear view of the imaging module as shown in FIG. 2.
Figure 6:
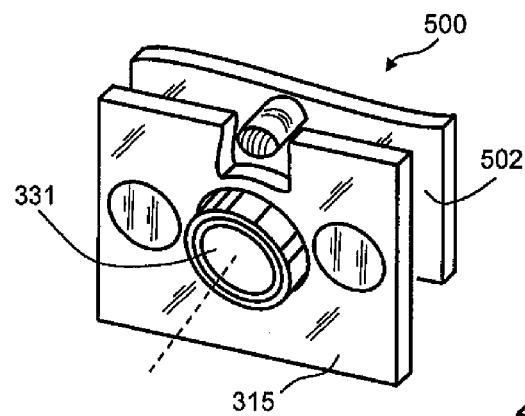
FIG. 6 is a perspective view of another exemplary imaging module which may be incorporated in an indicia reading terminal.
Figure 7:
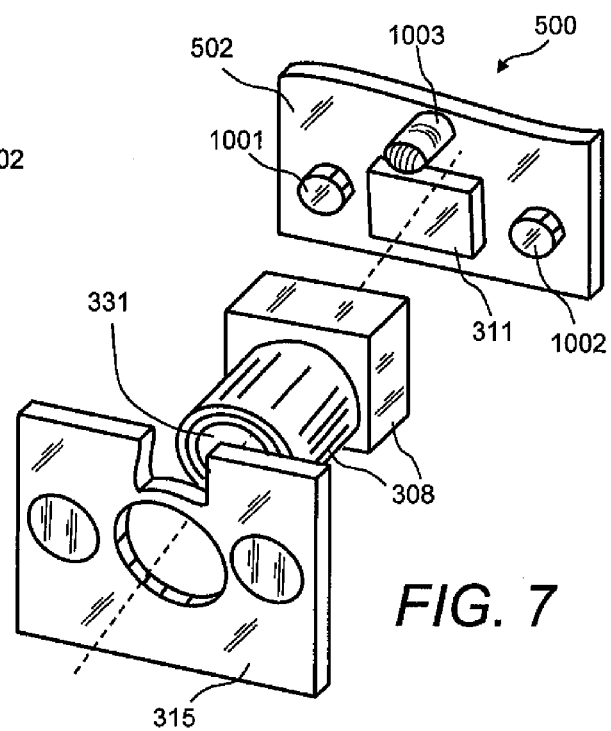
FIG. 7 is an exploded assembly view of the imaging module as shown in FIG. 6.
Figure 8:
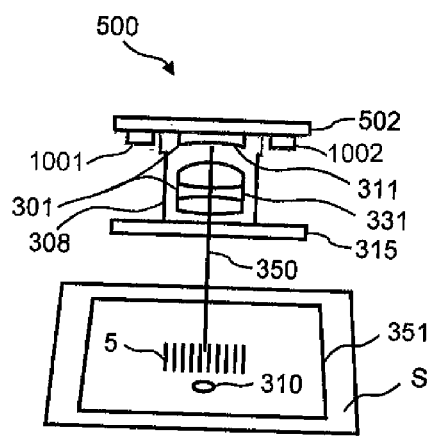
FIG. 8 is a cutaway top view of the imaging module as shown in FIG. 6.

Referring now to further aspects of imaging module 400 and imaging module 500, imaging module 400 and imaging module 500 can be prepackaged imaging modules, meaning that they are entirely or substantially entirely assembled into the form shown in FIGS. 2 and 5, respectively prior to being installed into a terminal housing such as housing 11 (FIGS. 14, 15). When in an assembled form as shown in FIGS. 2 and 5, components of imaging module 400, 500 are held in a certain position relative to one another.

In one aspect of a plural image sensor imaging module, imaging module, e.g., module 400 can be adapted to emulate the controllability and output characteristics of an imaging module e.g., module 500 having a single image sensor. For example, as will be described further herein imaging module 400 can have a certain number of image data output contacts forming a set of image data contacts and image data corresponding to any one of the image sensors (e.g., image sensors 111, 211) of the imaging module can be output through the set of image data contacts. In one embodiment, a plural image sensor imaging module can be provided having a plurality of image sensors and a single set of video contacts provided for purposes of asynchronously transmitting image data corresponding to image systems generated by each of the image sensors.

In another aspect, a kit can be provided having a multiple module supporting image capture and processing circuit that is adapted to capture and process image data corresponding to image signals generated by either one of plural image sensor imaging module, e.g., module 400 or a single image sensor imaging module 500. That is, either one of imaging module 400 or 500 can be connected to a specifically adapted image capture and processing circuit and the specifically adapted image capture and processing circuit can receive and process corresponding image signals to generate image data from the connected module. A kit can further include a specifically adapted plural image sensor imaging module and a particularly adapted single image sensor imaging module which are specifically adapted so that the specifically adapted image capture and processing circuit can receive and process image data corresponding to image signals generated by either the plural image sensor imaging module or the single image sensor imaging module. Such a kit can be utilized by manufacturers of indicia reading terminals (including integrator manufacturers) for the manufacture of bar code and other types of indicia reading terminals.

A representation of a kit for use by manufacturers of indicia reading terminals is shown in FIG. 16. Kit 1500 can comprise a multiple module image capture and processing circuit 1510 disposed on a common circuit board 1402 (which can be referred to as a motherboard), a set of candidate plural image sensor imaging modules 400, 401 and a set of candidate single image sensor imaging modules 500, 501. In use, one of imaging modules 400, 401, 500, 501 can be connected to motherboard 1402 that carries image capture and processing circuit 1510. In one embodiment, any one of imaging modules 400, 401, 500, 501 can be connected to motherboard 1402, carrying image capture and processing circuit 1510, through a flex connector 1520. It can be seen that kit 1500 can advantageously reduce manufacturing and maintenance costs for indicia reading terminal 100. For example suppose a customer orders S plural module indicia reading terminals and T single image sensor indicia reading terminals. If a custom made image capture and processing circuit were provided for each module type, the manufacturer would have to provide S image capture and processing circuits for use with the plural image sensor module and T image capture and processing circuits for use with the single image sensor module. The manufacturer would therefore have to design and manufacture two different image capture and processing circuits. With use of kit 1500 design costs can be reduced since only one not two image capture and processing circuits are provided. With use of kit 1500, the customer order can be filled by manufacturing S+T like manufactured image capture and processing circuits. Given principles of economies of scale, the manufacturing costs associated with providing S+T commonly manufactured units can be expected to be less than the costs associated with the manufacture of S first units and T second units.

Further aspects of kit 1500 and of a plural image sensor imaging module 400 for use with kit 1500 are described with reference to FIG. 17, where the components of module 400 can function in accordance with the corresponding components shown and described in connection with FIG. 10 and where the components of image capture and processing circuit 1510 can function in the manner of the corresponding components shown and described in connection with the circuits of FIGS. 10 and 11. While the kit depicted in FIG. 17 is shown in assembled form as having image module 400 connected to image capture processing circuit 1510, it is understood that another imaging module type such as module 401, 500 (having the components of and functioning in the manner described in connection with FIG. 11), or module 501 could be connected to image capture and processing circuit 1510. In one example, the various types of imaging modules 400, 401, 500, 501 can be differentiated in terms of the characteristics of the imaging assembly or assemblies incorporated therein. For example, imaging module 400 can have imaging assemblies according to Embodiment A of Table A, and imaging module 401 can have imaging assemblies according to Embodiment B (or; alternatingly C, or D, or E, or F) of Table A. Imaging module 500 can have a two dimensional image sensor and a first fixed best focus distance, while imaging module 501 can have a linear image sensor and a second fixed best focus distance.

FIG. 17 shows a specific embodiment of a terminal circuit having a plural image sensor imaging module 400 adapted to be in communication with a multi-module image capture and processing circuit 1510 which is adapted to receive many different alternative candidates and modules which can be of a variety of different embodiments (types). In the specific embodiment of FIG. 16 image capture and processing circuit 1510 can be adapted to receive plural image sensor imaging modules of any of the embodiments summarized in Table A as well as several embodiments of single image sensor imaging modules. Image capture and processing circuit 1510 can be adapted so that the components of image capture and processing circuit 1510 function in the manner of the corresponding components described in connection with the circuits shown in FIGS. 10 and 11. For example, image capture and processing circuit 1510 can be adapted so that frames of image data can be received into RAM 80, and further so that processor 60 can address such frames for subjecting such frames to decoding (e.g., bar code decoding for attempting to decode a bar code) processing.

For supporting multiple imaging modules, resources such as software resources can be incorporated into image capture and processing circuit 1510. Software resources for supporting multiple alternative imaging modules can be suitably stored in non-volatile memory 82. For example, first resources can be provided for supporting a first embodiment (type) of plural image sensor imaging module, second resources can be provided for supporting a second embodiment (type) of a plural image sensor imaging module, third resources can be provided for supporting a first embodiment (type) of a single image sensor imaging module fourth resources can be provided for supporting a second embodiment (type) of a single image sensor imaging module and so on. Further, each imaging module 400, 401, 500, 501 can have a memory storing identifying information for the imaging module. Identifying information in one embodiment can be a memory stored serial number for an imaging module in one embodiment. In another embodiment, identifying information for an imaging module, e.g., module 400, 401, 500, 501 can be a set of two wire interface addresses for integrated circuits of an imaging module 400, 401, 500, 501. Each integrated circuit of an imaging module that is in communication with two wire interface bus 1540 can be assigned a different two wire interface address for use in communicating with the integrated circuit. Processor 60 of image capture and processing circuit 1510 can be configured to execute a command wherein processor 60 reads the two wire interface addresses of all integrated circuits of a connected imaging module e.g., 400, 401, 500, 501 and determines the type of the connected module based on the returned address information. In another embodiment, identifying information for an imaging module can be image data output by the imaging module which can be processed by an image capture and processing circuit for determining an identity of a connected image sensor (each candidate imaging module can be expected to output image data having unique characteristics detectable with use of image capture and processing circuit 1510). Kit 1500 can be provided so that when a specific imaging module (which may be plural image sensor or single image sensor) is connected to image capture and processing circuit 1510 (e.g., by connecting the module to a ribbon connector connected to the image capture and processing circuit 1510) the image capture and processing circuit 1510 responsively to a module being connected to the image capture and processing circuit 1510, reads the identifying information and responsively activates the appropriate resources (e.g., first, second, third, or fourth) depending on which type of imaging module has been connected. The resources associated with each imaging module can determine, e.g., the available configurations associated with each module, and the behavior of the imaging module when operating in accordance with a particular configuration. Kit 1500 can also be adapted so that image capture and processing circuit 1510 reads identifying information and responsively activates appropriate resources in response to receipt of a user initiated command input by using a user interface.

Aspects of specific examples of a kit for use in manufacturing indicia reading terminals are now further described. In one embodiment, as is indicated in FIG. 18, terminal 100 can be constructed so that dual DMA channels 70 and 70' and dual processors 60 and 60' are provided for capture and processing of image data corresponding to image signals generated by image sensor 111 and image sensor 211. In the embodiment of FIG. 18, a common two wire interface bus 1540 is provided for use by processor 60 and processor 60'. Processor 60 can utilize bus 1540 for sending imaging commands and parameter data to image sensor 111, while processor 60' can utilize common bus 1540 for sending imaging commands and parameter data to image sensor 211.

In the embodiment of FIG. 17 circuit 1510 of reduced cost can be provided so that a single DMA channel 70 is provided for capture of image data corresponding to image signals generated by each of image sensor 111 and image sensor 211. The connected imaging module 400 of FIG. 17 is shown as having a multiplexer 72 receiving image data representing light incident on a first image sensor 111 or a second image sensor 211 as described e.g., in connection with FIG. 10. As will be described herein, multiplexer 72 can output image data for transmission through a set of video contacts. As indicated by dashed-in border 1530, DMA unit 70 and processor 60 can be integrated onto a common processor IC chip having DMA functionality. DMA unit 70 can also be provided by a dedicated hardware element e.g., a field programmable gate array (FPGA) or an application specific integrated circuit (ASIC). A processor IC chip having DMA functionality can have an associated buffer 68, facilitating receipt of asynchronously clocked image data clocked asynchronously relative to a master clock of the processor IC chip designated by dashed-in border 1530. One commercially available integrated circuit chip having integrated DMA functionality is the XSCALE PXA27X microprocessor available from Intel, Inc. Another commercially available integrated circuit chip having integrated DMA functionality is the FREESCALE MC9328MXL microprocessor available from Freescale Semiconductor, Inc.

Figure 9:
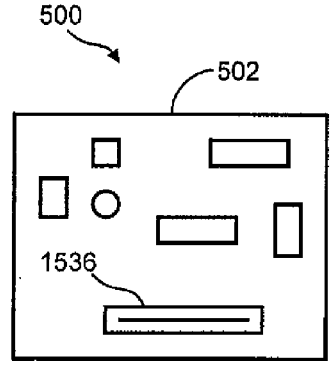
FIG. 9 is a rear view of the imaging module as shown in FIG. 6.

For feeding image data corresponding to image signals generated by each of image sensor 111 and image sensor 211 into the single DMA unit 70, imaging module 400 can have a connector port 1536. Connector port 1536 can have a plurality of electrical contacts e.g., contacts C00-C31 (contacts). In one embodiment, connector port 1536 can be a ribbon connector port having a plurality of contacts for detachably receiving a ribbon connector 1520. In another embodiment, connector port 1536 can be a pin connector or a hole connector of a pin and hole type connector port. Connector port 1536 in one embodiment can have a plurality of contacts C00 through C31 for transmission of image data corresponding to image signals generated by both of image sensor 111 and image sensor 211, and for transmission of various control and handshaking signals between imaging module 400 and image capture and processing circuit 1510. Connector port 1536 as shown in the embodiments of FIG. 5, FIG. 9, FIG. 16, is shown as being mounted to an imaging module circuit board carrying one or more image sensors and therefore is shown as being held in a certain position relative to one or more image sensors. In another embodiment, connector port 1536 can be tethered, e.g., via a flex connector to a major body of an imaging module.

In another embodiment, connector port 1536 in any of the embodiments shown, can be deleted and substituted for by an exposed set of electrical contacts. Circuitry e.g., image capture and processing circuit 1510 can be connected to an imaging module having an exposed set of electrical contacts by soldering to electrical leads to the exposed set of electrical contacts.

A contact layout of an imaging module in one embodiment is summarized in Table 3, wherein a number of contacts are provided by contacts enumerated C00-C31. Contacts as summarized in Table 3 can be e.g., contacts of connector port 1536 or exposed contacts of an imaging module for soldering to external circuitry.

TABLE 3

| CONTACT | ASSIGNMENT |
|---------|------------|
| C00 | Ground |
| C01 | Power |
| C02 | Video |
| C03 | Video |
| C04 | Video |
| C05 | Video |
| C06 | Video |
| C07 | Video |
| C08 | Video |
| C09 | Video |
| C10 | Video |
| C11 | Video |
| C12 | HSYNC |
| C13 | VSYN |
| C14 | PLCK |
| C15 | Reset |
| C16 | Standby |
| C17 | SDA |
| C18 | SCL |
| C19 | |
| C20 | |
| C21 | |
| C22 | |
| C23 | |
| C24 | |
| C25 | |
| C26 | |
| C27 | |

TABLE 3-continued

| CONTACT | ASSIGNMENT |
|---|---|
| C28 | |
| C29 | |
| C30 | |
| C31 | |

Regarding the assignment of contacts C00-C31 contacts C02-C011 can be assigned for carrying image data. For example, if the image data is 10 bit image data ten (10) image data contacts (designated "video" contacts in Table 3) can be provided. If the image data is 8 bit image data eight (8) image data contacts can be provided. Regarding additional contact assignments of connector port 1536, contact C01 can be a power/enable contact for delivering power to imaging module 400 from motherboard 1402, contact C00 can be a ground contact for carrying a ground path to imaging module 400, and contact C15 can be a reset contact for transmitting a reset signal. A reset signal can be transmitted over contact C15 to a set of integrated circuits, e.g., integrated circuits 111, 211, 72 of a connected imaging module into a reset state. Further, contact C16 can be a standby contact. A standby signal can be transmitted over contact C16 to set integrated circuits, e.g., integrated circuits 111, 211, 72, into a standby (low power) state. Referring to contact C12, contact C13 and contact C14, contacts C12, C13, C14 can be contacts for carrying horizontal (row) synchronization signals (HSYNC), vertical (frame) synchronization signals (VSYNC) and pixel clock (PLCK) signals from image sensor 111 and from image sensor 211. Such signals can be received by DMA unit 70 and can be received by camera interface buffer 68 which is interfaced to DMA unit 70. Row synchronization, frame synchronization, and pixel clock signals can be performing timing operations so that frames of image data are appropriately written into memory 80 where frames can be addressed for further processing by processor 60. In one embodiment, a master clock signal can be delivered from processor integrated circuit 1530 to imaging module 400. However, in another embodiment, as is indicated by imaging module clock 1533, imaging module 400 and image capture and processing circuit 1510 can have asynchronous clocks.

Further regarding connector port 1536, connector port 1536 is shown as including a single power signal contact C01. In other embodiments, connector port 1536 can have additional power signal contacts. For example, where light source banks 1001, 1002, 1003, 1004 might consume substantial power, additional illumination power signal lead lines might be provided to avoid noise coupling between illumination image sensor and power lead lines. Additional power signal contacts can also reduce a voltage drop across a connector, e.g., a flex strip connector connecting image capture and processing circuit 1510 and an imaging module, e.g., imaging module 400.

Contacts C00-C31 can also include two wire interface (TWI) contacts that form part of a command carrying digital bus such as two wire interface bus 1540. It is seen that the circuit of FIG. 17 including the combined circuitry of imaging module 400 and image capture and processing circuit 1510 can include a two wire interface bus 1540 partially disposed on imaging module and partially disposed on spaced apart image capture and processing circuit 1510 that enables processor 60 to send commands to various integrated circuits of imaging module 400. In one example, two wire interface bus 1540 includes signal line 1540*a* (SDA line) for transmitting data and clocking signal line 1540*b* (SCL line) for transmitting a clocking signal. In the example of Table 3, contact C17 forms part of the data signal line and contact C18 forms part of the clocking signal line. Data signal line 1540*a* can carry address information commands (e.g., exposure, gain, output enable, output disable) and parameters (exposure values, gain values). In the example of FIG. 17, the data signal line contact and clocking signal signal line contact can be interfaced to TWI bus signal lines of ribbon connector 1520 which in turn are connected to TWI bus signal lines of connector port 1546 of motherboard 1402 which in turn are interfaced to the portion of TWI bus 1540 on motherboard 1402. In one embodiment, two wire interface bus 1540 is provided by a PHILLIPS I$^2$C bus.

Various integrated circuits of imaging module 400; namely, image sensor 111, image sensor 211, and MUX 72 (provided in the specific embodiment by a field programmable gate array (FPGA)) can be adapted to interpret and execute the commands sent on data signal line 1540*a*. For controlling image sensor 111 and image sensor 211 in a coordinated manner, processor 60 can send various commands on two wire interface bus 1540. On data signal line 1540*a* there can be time divided address data, commands, and parameter data, the address data indicating which of the integrated circuits of imaging module 400 will interpret the command. On clock signal line 1540*b* there are transmitted clocking signals. For providing a single two wire interface bus 1540 that supports and which can transmit commands to a plurality of integrated circuits, e.g., image sensor integrated circuits 111 and 211, each integrated circuit can be assigned a different two wire interface address so that commands and/or parameter data intended for a specific integrated circuit can be sent to a specific integrated circuit. The manner in which processor 60 can send commands over two wire interface bus 1540 depends on which configuration, e.g., a configuration as summarized in Table 1 has been made active. Serially transmitted commands that can be transmitted on signal line 1540*a* can be, e.g., image sensor enable commands, image sensor disable commands, exposure commands, gain commands, address data commands (commands). Parameter data transmitted on data signal line 1540*a* can be serially transmitted data.

For example, for Configuration C of Table 1 wherein frames from two different imaging assemblies can be captured and subject to decoding processing the following set of commands, summarized in Table 4 can be initiated by processor 60 and transmitted through two wire interface 1540.

TABLE 4

```
{
if (SENSOR1_frame)
{
compute newEXP(Sensor1, &nExposure1);
compute newGAIN(Sensor1, &nGain1);
SENSOR.WriteIIC(SENSOR1_EXPOSURE_REG,&nExposure1,1);
SENSOR.WriteIIC(SENSOR1_ANALOG_GAIN_REG,&nGain1,1);
}
if (SENSOR2_frame)
{
compute newEXP(Sensor2,&nExposure2);
compute newGAIN(Sensor2,&nGain2);
SENSOR.WriteIIC(SENSOR2_EXPOSURE_REG,&nExposure2,1);
SENSOR.WriteIIC(SENSOR2_ANALOG_GAIN_REG,&nGain2,1);
}
}
```

Further regarding the circuit diagram of FIG. 17, two wire interface bus 1540 can also be coupled to regulators 74, 76, 174, 176. As noted, regulators 74, 76, 174, 176 can be adapted to deliver power to light source banks 1001, 1002 and aiming light source banks 1003, 1004. Coupling two wire interface bus 1540 to regulators 74, 76, 174, 176 enables light source bank control commands to be transmitted through bus 1540 for interpretation and execution by regulators 74, 76, 174, 176, all of which can be equipped with registers and microcontrollers for receiving and executing light source bank control commands. Additionally a frame synchronization signal (e.g., a VSYNC signal) output by image sensor 111 and image sensor 211 can be input to regulators 74, 76, 174, 176 so that operation of light source banks 1001, 1002 and aiming light source banks 1003, 1004 can be appropriately synchronized with the operation of image sensors 111, 211. Also, an exposure output signal output from image sensor 111, 211 can be input to regulators 74, 76, 174, 176 for synchronization between image sensors 111, 211 and light source banks 1001, 1002, 1003, 1004. In a further aspect, imaging module 400 can include a dedicated imaging module clock 1533 which operates separately and asynchronously relative to a master clock of a processor integrated circuit designated by dashed-in border 1530. As indicated in the circuit diagram of FIG. 17, a clocking signal can be interfaced to image sensor 111, image sensor 211, and multiplexer 72. Providing a dedicated imaging module clock 1533 alleviates a need to transmit a master clocking signal from image capture and processing circuit 1510 and hence, alleviates a need to provide an additional signal line in a connector, e.g., connector 1520 connecting imaging module 400 and image capture and processing circuit 1510.

As the number of signal lines of connector port 1536 increase it can be expected that electromagnetic interference radiation (EMI) radiating from the signal lines of ribbon connector 1520 can increase. Where terminal 100, as shown in the embodiment of FIG. 18 incorporates a sufficient number of signal lines for simultaneously carrying image data corresponding to image sensor 111 and image sensor 211 the EMI radiation level for connector 1520 can be expected to be relatively higher than for the embodiment where the connector 1520 has sufficient signal lines for alternatingly transmitting image data corresponding to image signals generated by image sensor 111 and image sensor 211. Further, where an imaging module includes one image sensor (as shown in FIG. 19) or a plurality of image sensors the EMI radiation level can be expected to be increased as the resolution of the image sensor image data increases (e.g., from 8 bit requiring 8 data signal lines, to 10 bit to 16 bit to 32 bit).

A circuit limiting the amount of EMI radiation radiating from a connector connecting terminal imaging module 400 to an image processing circuit 1510 is described with reference to FIG. 20. As shown in FIG. 15, an imaging module 400, 401, 500, 501 can be spaced apart from a motherboard 1402 which carries image capture and processing circuit 1510. In the embodiment of FIG. 20, an imaging module 400 or 500 having the components generally described with reference to the embodiment of FIG. 20 (circuit 1702 of FIG. 20 represents the components within dashed border 1702 of FIG. 17 or alternatively the components within dashed border 1702 of FIG. 18 or alternatively, the components within dashed border 1702 of FIG. 19) can include a parallel to serial converter 1710 and an image capture and processing circuit 1510 of terminal 100 can include a serial to parallel converter 1712 which is interfaced to circuit 1704 representing the components within dashed-in border 1704 of FIG. 17 or alternatively the components within dashed-in border 1704 of FIG. 18 or alternatively the components within dashed-in border 1704 of FIG. 19. Parallel to serial connector 1710 can receive for conversion a plurality of input data signals, input in parallel. Such parallel input data signals can include data signals forming multi-bit image data values. Shown as being a component separate from image sensors 111, 211 parallel to serial, converter 1710 can be incorporated into an integrated circuit forming image sensor 111, 211, 311 (of a single image sensor imaging module). Between converter 1710 and converter 1712 there can be provided a complementary differential pair interface connector 1716 having a pair of signal lines transmitting a differential pair of signals. Differential pair connector 1716 can be connected to differential pair connector port 1711 which receives an output from parallel to serial converter 1710 and differential pair connector port 1713 which transfers differential pair signals to serial to parallel converter 1712. Converter 1710 and converter 1712 can be complementarily adapted so that converter 1712 can process the received signal from the differential pair to recover the parallel input data signals input to converter 1710. Providing converters 1710, 1712 and connector 1716 can greatly reduce the number of signal lines between an imaging module, e.g., imaging module 400, 401, 500, 501, and an image capture and processing circuit 1510. Connector 1716 can be provided, e.g., by a set of twisted pair signal lines, a Twinax cable, or a set of closely coupled differential traces of a flex circuit. Accordingly, a set of differential pair signal lines can be integrated into ribbon connector 1520. In another embodiment adapted so that EMI emissions are reduced, parallel to serial converter 1710 can be a converter adapted to convert parallel input data signals to into a serially output optical signal output by converter 1710 to connector 1716, and converter 1712 can be a converter adapted to process received serially transmitted optical signals to recover the set of parallel data signals received at converter 1710. Connector 1716 in such an embodiment can be a fiber optic cable adapted to transmit a serially output optical signal output by parallel to serial converter 1710. Parallel to serial converter 1710 can be disposed on an imaging module. For example, one or more circuits forming parallel to serial converter 1710 can be mounted to circuit board 402 (FIG. 5) in an example of a plural image sensor imaging module or circuit board 502 (FIG. 9) in an example of a single image sensor imaging module.

A small sample of the methods of an apparatus described herein are as follows.

A1. A hand held indicia reading terminal for reading a decodable indicia disposed on a substrate, said hand held indicia reading terminal comprising:

an imaging assembly comprising an image sensor generating image signals and an imaging lens focusing an image onto an active surface of said image sensor, the imaging assembly having a field of view defined on said substrate when an imaging axis of said imaging assembly is directed toward said substrate;

a working memory receiving image data corresponding to said image signals;

a first illumination assembly having a first light source bank directing light toward said field of view;

a second illumination assembly having a second light source bank directing light toward said field of view;

wherein said terminal is adapted so that when a trigger signal is active said terminal receives into said working memory a certain and a subsequent frame of image data, wherein each of the certain and subsequent frames has a corresponding exposure period, wherein said first frame of image data has a first illumination profile and said subsequent frame of image data has a second illumination profile, the first illumination profile being different than said second illumination profile, the first illumination profile being characterized by said first light source bank being ON and said second light source bank being OFF during said exposure period corresponding to said certain frame, said second illumination profile being characterized by said first light source bank being OFF and said second light source bank being ON during said exposure period corresponding to said subsequent frame of image data;

wherein said terminal is adapted so that said terminal can process said certain frame of image data to determine a first set of code words, process said subsequent frame of image data to determine said second set of code words and combine said first and second set of code words.

B1. A hand held indicia reading terminal for reading a decodable indicia disposed on a substrate, said hand held indicia reading terminal comprising:

an imaging assembly comprising an image sensor generating image signals and an imaging lens focusing an image onto an active surface of said image sensor, the imaging assembly having a field of view defined on said substrate when an imaging axis of said imaging assembly is directed toward said substrate;

a working memory receiving image data corresponding to said image signals;

a first illumination assembly having a first light source bank directing light toward said field of view;

a second illumination assembly having a second light source bank directing light toward said field of view;

a trigger button;

wherein said terminal is adapted so that when a trigger signal is active said terminal operates in a first mode until a timeout period has expired and then switches to a second mode, wherein said terminal is adapted so that said timeout period is satisfied conditionally on the condition that said terminal does not determine a decoded message corresponding to said decodable indicia prior to said timeout period;

wherein said terminal in said first mode receives into said working memory for decoding processing a plurality of frames, each frame subject to decoding processing in said first mode having a common illumination profile;

wherein said terminal in said second mode varies an illumination profile of received frames received for decoding processing in such manner that in said second mode said terminal receives into a said working memory a certain and a subsequent frame of image data, wherein each of the certain and subsequent frames has a corresponding exposure period, wherein said first frame of image data has a first illumination profile and said subsequent frame of image data has a second illumination profile, the first illumination profile being different than said second illumination profile, the first illumination profile being characterized by said first light source bank being ON and said second light source bank being OFF during said exposure period corresponding to said certain frame, said second illumination profile being characterized by said first light source bank being OFF and said second light source bank being ON during said exposure period corresponding to said subsequent frame of image data;

wherein said terminal is adapted to subject to decoding processing each of said certain and subsequent frames of image data received in said second mode.

C1. A hand held indicia reading terminal for reading a decodable indicia disposed on a substrate, said hand held indicia reading terminal comprising:

a first imaging assembly comprising a first image sensor generating image signals and an imaging lens focusing an image onto an active surface of said first image sensor, the imaging assembly having a first field of view defined on said substrate when an imaging axis of said first imaging assembly is directed toward said substrate;

a second imaging assembly comprising a second image sensor generating image signals and an imaging lens focusing an image onto an active surface of said second image sensor, the imaging assembly having second field of view defined on said substrate overlapping said first field of view when an imaging axis of said second imaging assembly is directed toward said substrate;

a working memory, wherein said terminal is adapted so that said terminal can receive image data corresponding to image signals generated either by said first image sensor or said second image sensor into said working memory;

a first illumination assembly having a first light source bank directing light toward said first and second fields of view;

a second illumination assembly having a second light source bank directing light toward said first and second fields of view;

wherein said terminal is adapted so that when a trigger signal is active said terminal receives into a said working memory for decoding processing a certain and a subsequent frame of image data, wherein each of the certain and subsequent frames has a corresponding exposure period, wherein said certain frame of image data has a first set of imaging attributes and said subsequent frame of image data has a second set of imaging attributes;

wherein said first set of imaging attributes are characterized by the following: said first light source bank is OFF during said exposure period corresponding to said certain frame; said second light source bank is ON during said exposure period corresponding to said certain frame, and said certain frame of image data comprises image data corresponding to image signals generated by said first image sensor; and wherein said second set of imaging attributes are characterized by the following: said first light source bank is ON during said exposure period corresponding to said subsequent frame; said second light source bank is OFF during said exposure period corresponding to said subsequent frame, and said subsequent frame of image data comprises image data corresponding to image signals generated by said second image sensor.

C2. The hand held indicia reading terminal of claim C1 wherein said first imaging assembly and said second imaging assembly have different fixed best focus distances.

C3. The hand held indicia reading terminal of claim C1, wherein one of said first and second image sensors is a monochrome image sensor and a remaining of said first and second image sensors is a color image sensor.

C4. The hand held indicia reading terminal of claim C1, wherein one of said first and second image sensors is a linear image sensor and a remaining of said first and second image sensors is a two dimensional image sensor.

C5. The hand held indicia reading terminal of claim C1, wherein one of said first and second image sensors is a linear monochrome image sensor and a remaining of said first and second image sensors is a two dimensional color image sensor.

D1. A hand held indicia reading terminal for reading a decodable indicia disposed on a substrate, said hand held indicia reading terminal comprising:

a printed circuit board;

a first imaging assembly comprising a first image sensor generating image signals and an imaging lens focusing an image onto an active surface of said first image sensor, the imaging assembly having a first field of view defined on said substrate when an imaging axis of said imaging assembly is directed toward said substrate, said first image sensor being provided by a first integrated circuit chip, said first integrated circuit chip being mounted to said printed circuit board;

a second imaging assembly comprising a second image sensor generating image signals and an imaging lens focusing an image onto an active surface of said second image sensor, the imaging assembly having second field of view defined on said substrate overlapping said first field of view when an imaging axis of said imaging assembly is directed toward said substrate, said second image sensor being provided by a second integrated circuit chip, said second integrated circuit chip being mounted to said printed circuit board, said printed circuit board being a single printed circuit board commonly carrying said first integrated circuit chip and said second integrated circuit chip; and a first configuration and a second configuration, the terminal being adapted so that an operator can manually select said first configuration and can further manually select said second configuration, wherein said terminal when said first configuration is active operates according to said first configuration, the terminal further being adapted so that when said second configuration is active said terminal operates in accordance with said second configuration;

wherein said terminal is adapted so that when a trigger signal and said first configuration and said trigger signal are active, said terminal receives into said working memory for decoding processing a plurality of frames of image data, each of said plurality of frames of image data representing light incident on a select one of said first image sensor and said second image sensor, wherein said terminal does not receive into said working memory for decoding processing frames of image data representing light incident on an image sensor other than said select one of said first image sensor and said second image sensor when said first configuration is active;

wherein said terminal is further adapted so that when said second configuration and a trigger signal are active, said terminal receives into said working memory for decoding processing a certain and a subsequent frame of image data, wherein each of the certain and subsequent frames has a corresponding exposure period, wherein said certain frame of image data represents light incident on said first image sensor and wherein said subsequent frame of image data represents light incident on said second image sensor.

D2. The hand held indicia reading terminal of claim D1, wherein said first imaging assembly and said second imaging assembly have different fixed best focus distances.

D3. The hand held indicia reading terminal of claim D1, wherein one of said first and second image sensors is a monochrome image sensor and a remaining of said first and second image sensors is a color image sensor.

D4. The hand held indicia reading terminal of claim D1, wherein one of said first and second image sensors is a linear image sensor and a remaining of said first and second image sensors is a two dimensional image sensor.

D5. The hand held indicia reading terminal of claim D1, wherein one of said first and second image sensors is a linear monochrome image sensor and a remaining of said first and second image sensors is a two dimensional color image sensor.

E1. A hand held indicia reading terminal for reading a decodable indicia disposed on a substrate, said hand held indicia reading terminal comprising:

a first imaging assembly comprising a first image sensor generating image signals and an imaging lens focusing an image onto an active surface of said first image sensor, the imaging assembly having a first field of view defined on said substrate when an imaging axis of said imaging assembly is directed toward said substrate;

a support assembly for carrying said imaging lens of said first imaging assembly, said imaging lens of said first imaging assembly having a plurality of lens elements said support assembly carrying each of said plurality of lens element;

a second imaging assembly comprising a second image sensor generating image signals and an imaging lens focusing an image onto an active surface of said second image sensor, the imaging assembly having second field of view defined on said substrate overlapping said first field of view when an imaging axis of said imaging assembly is directed toward said substrate;

wherein said support assembly carrying said imaging lens of said first imaging assembly further carries said imaging lens of said second imaging assembly, said imaging lens of said second imaging assembly having a plurality of lens elements, said support assembly being a one piece support assembly commonly supporting a first set of lens elements forming a lens assembly of said first imaging assembly and a second set of lens elements forming a lens assembly of said second imaging assembly;

a first configuration and a second configuration, the terminal being adapted so that an operator can manually select said first configuration and can further manually select said second configuration, wherein said terminal when said first configuration is active operates according to said first configuration, the terminal further being adapted so that when said second configuration is active said terminal operates in accordance with said second configuration;

wherein said terminal is adapted so that when a trigger signal and said first configuration are active said terminal receives into said working memory for decoding processing a plurality of frames of image data each of said plurality of frames of image data representing light on a select one of said first image sensor and said second image sensor, said terminal not receiving for decoding processing frames of image data representing light on a remaining of said first or second image sensors wherein said first configuration is active;

wherein said terminal is adapted so that when said trigger signal and second configuration are active, said terminal receives into said working memory for decoding processing a certain and a subsequent frame of image data, wherein each of the certain and subsequent frames has a corresponding exposure period, wherein said certain frame of image data represents light incident on said first image sensor and wherein subsequent frame of image data represents light incident on said second image sensor.

F1. A hand held indicia reading terminal for reading a decodable indicia disposed on a substrate, said hand held indicia reading terminal comprising:

a first imaging assembly comprising a first image sensor generating image signals and an imaging lens focusing an image onto an active surface of said first image sensor, the imaging assembly having a first field of view defined on said substrate when an imaging axis of said imaging assembly is directed toward said substrate;

a second imaging assembly comprising a second image sensor generating image signals and an imaging lens focusing an image onto an active surface of said second image sensor, the imaging assembly having second field of view defined on said substrate overlapping said first field of view when an imaging axis of said imaging assembly is directed toward said substrate;

a working memory, wherein said terminal is adapted so that said terminal can receive image data corresponding to image signals generated either by said first image sensor or said second image sensor into said working memory;

a first illumination assembly having a first light source bank directing light toward said first and second fields of view;

a second illumination assembly having a second light source bank directing light toward said first and second fields of view;

wherein said terminal is adapted so that when a trigger signal is active said terminal operates in a first mode until a timeout period has expired and then switches to a second mode, wherein said terminal is adapted so that said timeout period is satisfied conditionally on the condition that said terminal does not determine a decoded message corresponding to said decodable indicia prior to said timeout period;

wherein said terminal in said first mode receives a plurality of frames of image data for decoding processing, each of said plurality of frames of image data received in said first mode having an illumination profile characterized by said first and second light source banks being ON during each exposure period corresponding to one of said plurality of frames;

wherein said terminal in said second mode varies an illumination profile of received frames received for decoding processing in such manner that in said second mode said terminal receives into a said working memory a certain and a subsequent frame of image data, wherein each of the certain and subsequent frames has a corresponding exposure period, wherein said certain frame of image data has a first illumination profile and said subsequent frame of image data has a second illumination profile, the first illumination profile being different than said second illumination profile, the first illumination profile being characterized by said first light source bank being ON and said second light source bank being OFF during said exposure period corresponding to said certain frame, said second illumination profile being characterized by said first light source bank being OFF and said second light source bank being ON during said exposure period corresponding to said subsequent frame of image data.

F2. The hand held indicia reading terminal of claim F1, wherein said first imaging assembly and said second imaging assembly have different fixed best focus distances.

F3. The hand held indicia reading terminal of claim F1, wherein one of said first and second image sensors is a monochrome image sensor and a remaining of said first and second image sensors is a color image sensor.

F4. The hand held indicia reading terminal of claim F1, wherein one of said first and second image sensors is a linear image sensor and a remaining of said first and second image sensors is a two dimensional image sensor.

F5. The hand held indicia reading terminal of claim F1, wherein one of said first and second image sensors is a linear monochrome image sensor and a remaining of said first and second image sensors is a two dimensional color image sensor.

G1. A hand held indicia reading terminal for reading a decodable indicia disposed on a substrate, said hand held indicia reading terminal comprising:

a first imaging assembly comprising a first image sensor generating image signals and an imaging lens focusing an image onto an active surface of said first image sensor, the imaging assembly having a first field of view defined on said substrate when an imaging axis of said imaging assembly is directed toward said substrate;

a second imaging assembly comprising a second image sensor generating image signals and an imaging lens focusing an image onto an active surface of said second image sensor, the imaging assembly having second field of view defined on said substrate overlapping said first field of view when an imaging axis of said imaging assembly is directed toward said substrate;

a working memory, wherein said terminal is adapted so that said terminal can receive image data corresponding to image signals generated either by said first image sensor or said second image sensor into said working memory;

a first illumination assembly having a first light source bank directing light toward said first and second fields of view;

a second illumination assembly having a second light source bank directing light toward said first and second fields of view;

wherein said terminal is adapted so that when a trigger signal is active said terminal operates in a first mode until a timeout period has expired and then switches to a second mode, wherein said terminal is adapted so that said timeout period is satisfied conditionally on the condition that said terminal does not determine a decoded message corresponding to said decodable indicia prior to said timeout period;

wherein said terminal in said first mode receives a plurality of frames of image data for decoding processing, each of said plurality of frames of image data received in said first mode representing light incident on said first image sensor;

wherein said terminal in said second mode varies a source of received frames received for decoding processing in such manner that in said second mode said terminal receives into a said working memory for decoding processing a certain and a subsequent frame of image data, wherein said certain frame represents light incident on said first image sensor, and wherein said subsequent frame represents light incident on said second image sensor.

G2. The hand held indicia reading terminal of claim G1, wherein said first imaging assembly and said second imaging assembly have different fixed best focus distances.

G3. The hand held indicia reading terminal of claim G1, wherein one of said first and second image sensors is a monochrome image sensor and a remaining of said first and second image sensors is a color image sensor.

G4. The hand held indicia reading terminal of claim G1, wherein one of said first and second image sensors is a linear image sensor and a remaining of said first and second image sensors is a two dimensional image sensor.

G5. The hand held indicia reading terminal of claim G1, wherein one of said first and second image sensors is a linear monochrome image sensor and a remaining of said first and second image sensors is a two dimensional color image sensor.

H1. A hand held indicia reading terminal for reading a decodable indicia disposed on a substrate, said hand held indicia reading terminal comprising:

a printed circuit board;

a first imaging assembly comprising a first image sensor generating image signals and an imaging lens focusing an image onto an active surface of said first image sensor, the imaging assembly having a first field of view defined on said substrate when an imaging axis of said imaging assembly is directed toward said substrate, said first image sensor being provided by a first integrated circuit chip, said first integrated circuit chip being mounted to said printed circuit board;

a support assembly for carrying said imaging lens of said first imaging assembly, said imaging lens of said first imaging assembly having a plurality of lens elements said support assembly carrying each of said plurality of lens element;

a second imaging assembly comprising a second image sensor generating image signals and an imaging lens focusing an image onto an active surface of said second image sensor, the imaging assembly having second field of view defined on said substrate overlapping said first field of view when an imaging axis of said imaging assembly is directed toward said substrate, said second image sensor being provided by a second integrated circuit chip, said second integrated circuit chip being mounted to said printed circuit board, said printed circuit board being a single printed circuit board commonly carrying said first integrated circuit chip and said second integrated circuit chip;

wherein said support assembly carrying said imaging lens of said first imaging assembly further carries said imaging lens of said second imaging assembly, said imaging lens of said second imaging assembly having a plurality lens elements, said support assembly being a one piece support assembly commonly supporting a first set of lens elements forming a lens assembly of said first imaging assembly and a second set of lens elements forming a lens assembly of said second imaging assembly;

wherein said terminal is adapted so that when a trigger signal is active said terminal receives into said working memory for decoding processing a certain and a subsequent frame of image data, the certain frame of image data representing light incident on said first image sensor, the subsequent frame of image data representing light incident on said second image sensor; and wherein said terminal is adapted so that said terminal can process said certain frame of image data to determine a first set of code words, process said subsequent frame of image data to determine said second set of code words and combine said first and second set of code words.

I1. A hand held indicia reading terminal for reading a decodable indicia disposed on a substrate, said hand held indicia reading terminal comprising:

a first imaging assembly comprising a first image sensor generating image signals and an imaging lens focusing an image onto an active surface of said first image sensor, the imaging assembly having a first field of view defined on said substrate;

a second imaging assembly comprising a second image sensor generating image signals and an imaging lens focusing an image onto an active surface of said second image sensor, the imaging assembly having a second field of view defined on said substrate overlapping said first field of view when an imaging axis of said imaging assembly is directed toward said substrate;

wherein said terminal is adapted so that when a trigger signal is active said terminal receives into said working memory for decoding processing a certain and a subsequent frame of image data, the certain frame of image data representing light incident on said first image sensor, the subsequent frame of image data representing light incident on said second image sensor; and wherein said terminal is adapted so that said terminal can process said certain frame of image data to determine a first set of code words, process said subsequent frame of image data to determine said second set of code words and combine said first and second set of code words.

I2. The hand held indicia reading terminal of claim I1, wherein said first imaging assembly and said second imaging assembly have different fixed best focus distances.

I3. The hand held indicia reading terminal of claim I1, wherein one of said first and second image sensors is a monochrome image sensor and a remaining of said first and second image sensors is a color image sensor.

I4. The hand held indicia reading terminal of claim I1, wherein one of said first and second image sensors is a linear image sensor and a remaining of said first and second image sensors is a two dimensional image sensor.

I5. The hand held indicia reading terminal of claim I1, wherein one of said first and second image sensors is a linear monochrome image sensor and a remaining of said first and second image sensors is a two dimensional color image sensor.

J1. A hand held indicia reading terminal for reading a decodable indicia disposed on a substrate, said hand held indicia reading terminal comprising:

a first imaging assembly comprising a first image sensor having a plurality of pixels and generating image signals and an imaging lens focusing an image onto an active surface of said first image sensor, the imaging assembly having a first field of view defined on said substrate, wherein said first image sensor is a monochrome image sensor;

a second imaging assembly comprising a second image sensor having a plurality of pixels generating image signals and an imaging lens focusing an image onto an active surface of said second image sensor, the imaging assembly having second field of view defined on said substrate overlapping said first field of view when an imaging axis of said imaging assembly is directed toward said substrate, wherein said second image sensor is a color image sensor having color filter elements formed over pixels of said plurality of pixels;

a color processing module for processing an input raw color frame of image data into a monochrome frame of image data;

wherein said terminal is adapted so that when a trigger signal is active said terminal receives into said working memory for decoding processing a certain and a subsequent frame of image data, the certain frame of image data representing light incident on said first image sensor, the subsequent frame of image data representing light incident on said second image sensor; and wherein said terminal is adapted so that said terminal selectively avoids activating said color processing module when said certain frame of image data is received into said working memory and selectively activates said color processing module when said subsequent frame of image data is received into said working memory.

J2. The hand held indicia reading terminal of claim J1, wherein said first imaging assembly and said second imaging assembly have different fixed best focus distances.

J3. The hand held indicia reading terminal of claim J1, wherein one of said first and second image sensors is a monochrome image sensor and a remaining of said first and second image sensors is a color image sensor.

J4. The hand held indicia reading terminal of claim J1, wherein one of said first and second image sensors is a linear image sensor and a remaining of said first and second image sensors is a two dimensional image sensor.

J5. The hand held indicia reading terminal of claim J1, wherein one of said first and second image sensors is a linear monochrome image sensor and a remaining of said first and second image sensors is a two dimensional color image sensor.

K1. A hand held indicia reading terminal for reading a decodable indicia disposed on a substrate, said hand held indicia reading terminal comprising:

a printed circuit board;

a first imaging assembly comprising a first image sensor generating image signals and an imaging lens focusing an image onto an active surface of said first image sensor, the imaging assembly having a first field of view defined on said substrate when an imaging axis of said imaging assembly is directed toward said substrate, said first image sensor being provided by a first integrated circuit chip, said first integrated circuit chip being mounted to said printed circuit board;

a support assembly for carrying said imaging lens of said first imaging assembly, said imaging lens of said first imaging assembly having a plurality of lens elements said support assembly carrying each of said plurality of lens element;

a second imaging assembly comprising a second image sensor generating image signals and an imaging lens focusing an image onto an active surface of said second image sensor, the imaging assembly having second field of view defined on said substrate overlapping said first field of view when an imaging axis of said imaging assembly is directed toward said substrate, said second image sensor being provided by a second integrated circuit chip, said second integrated circuit chip being mounted to said printed circuit board, said printed circuit board being a single printed circuit board commonly carrying said first integrated circuit chip and said second integrated circuit chip;

wherein said support assembly carrying said imaging lens of said first imaging assembly further carries said imaging lens of said second imaging assembly, said imaging lens of said second imaging assembly having a plurality of lens elements, said support assembly being a one piece support assembly commonly supporting a first set of lens elements forming a lens assembly of said first imaging assembly and a second set of lens elements forming a lens assembly of said second imaging assembly;

wherein said terminal is adapted so that when a trigger signal is active said terminal receives into a working memory for decoding processing a certain and a subsequent frame of image data, the certain frame of image data representing light incident on said first image sensor, the subsequent frame of image data representing light incident on said second image sensor;

a direct memory access unit (DMA unit), wherein said terminal is adapted so that image data representing light incident on said first image sensor is routed through said DMA unit for receipt of said certain frame of image data into said working memory, the terminal further being adapted so that image data representing light incident on said second image sensor is routed through said DMA unit for receipt of said subsequent frame of image data.

AA1. An imaging module comprising:

a first image sensor having a first image sensor array;

a first imaging lens assembly disposed optically forwardly of first image sensor, the first imaging lens assembly and said first image sensor defining a first imaging assembly;

a second image sensor having a second image sensor array, wherein each of said first image sensor and said second image sensor are formed as integrated circuits and wherein each of said first image sensor and said second image sensor can interpret and execute commands serially transmitted on a data signal line of a digital bus, wherein said first image sensor is assigned a first address enabling addressing of said first image sensor via said digital bus, and wherein said second image sensor is assigned a second address enabling addressing of said second image sensor via said digital bus, the first address being different from said second address;

a second imaging lens assembly disposed optically forwardly of said second image sensor, the second imaging lens assembly and said image sensor forming a second imaging assembly, the first imaging assembly having a first field of view, the second imaging assembly having a second field of view, said imaging module being adapted so that said first field of view and said second field of view at least partially overlap on a substrate;

a printed circuit board carrying at least one of said first image sensor and said second image sensor; and a plurality of contacts including a plurality of video contacts, the plurality of video contacts for carrying image data corresponding to image signals generated by each of said first image sensor and said second image sensor, the plurality of contacts also having a data signal line contact forming part of a data signal line for serially transmitting commands to each of said first image sensor and said second image sensor.

AA2. The imaging module of claim AA1, wherein said printed circuit board is a common printed circuit board commonly carrying said first image sensor and said second image sensor and wherein said imaging module further includes a support commonly supporting said first imaging lens assembly and said second imaging lens assembly.

AA3. The imaging module of claim AA1, wherein said imaging module is adapted so that transmitted on said data signal line partially formed by said data signal line contact, said commands being selected from the group consisting of: output enable commands for said first image sensor, exposure control commands for said first image sensor gain control commands for said first image sensor, output enable commands for said second image sensor, exposure control commands for said second image sensor and gain control commands for said second image sensor.

AA4. The imaging module of claim AA1, wherein said digital bus is a two wire interface bus.

AA5. The imaging module of claim AA1, wherein said plurality of video contacts include a first set of video contacts dedicated for transmitting image data corresponding to image signals generated by said first image sensor and a second set of video contacts dedicated for transmitting image data corresponding to image signals generated by said second image sensor.

AA6. The imaging module of claim AA1, wherein said imaging module is adapted so that through certain of said plurality video contacts there can be transmitted image data corresponding to both image signals generated by said first image sensor and image data corresponding to image signals generated by said second image sensor.

AA7. The imaging module of claim AA1, wherein said imaging module is adapted so that through each of said plurality of video contacts there can be transmitted image data corresponding to both image signals generated by said first image sensor and image data corresponding to image signals generated by said second image sensor.

AA8. The image module of claim AA1, wherein said imaging module is adapted so that said plurality of contacts are formed on a connector port, wherein said connector port is held in a certain position relative to said first image sensor and said second image sensor.

AA9. The imaging module of claim AA1, wherein said printed circuit board commonly carries a first image sensor and a second image sensor, the module further having a single piece support assembly for supporting components of both said first imaging lens assembly and said second imaging lens assembly, the single piece support assembly being supported on said circuit board, wherein said imaging module further includes a first light source bank and a second light source bank, the imaging module being adapted so that light emitted by said first light source bank is projected into positions on said substrate within each of said first and second fields of view, the imaging module further being adapted so that light emitted by said second light source bank is projected into positions on said substrate within each of said first and second fields of view.

BB1. An indicia reading terminal comprising:
an imaging module having one or more image sensors, a printed circuit board and at least one imaging lens assembly, wherein circuitry of said imaging module outputs digitized multi-bit image data;
an image capture and processing circuit having a processor and an addressable memory addressable by said processor, the memory for retaining frames of image data corresponding to image signals generated by said imaging module;
a parallel to serial converter disposed on said imaging module and receiving said digitized multi-bit image data;
wherein said image capture and processing circuit includes a serial to parallel converter, the terminal further including a complementary differential pair connector facilitating communication between said parallel to serial and said serial to parallel converter, the parallel to serial converter outputting a complementary differential pair signal, the serial to parallel converter recovering said multi-bit image data being input to said parallel to serial converter and outputting data for retaining in said memory; and
a hand held housing incorporating both of said imaging module and said image capture and processing circuit.

BB2. The terminal of claim BB 1, wherein said connector is provided by a set of twisted prior signal lines.

BB3. The terminal of claim BB1, wherein said connector is provided by Twinax cable.

BB4. The terminal of claim BB1, wherein said connector is included in a ribbon connector including address signal lead lines for communicating signals between said image capture and processing circuit and said imaging module.

BB5. The terminal of claim BB1, wherein said image capture and processing circuit is disposed on a motherboard spaced apart from said imaging module.

BB6. The terminal of claim BB1, wherein said parallel to serial converter is integrated into an integrated circuit forming an image sensor of said imaging module.

CC1. An image capture and processing circuit for use in an indicia reading terminal, the image capture and processing circuit comprising:
a memory and a processor, the memory for retaining frames of image data that can be processed by said processor, the image capture and processing circuit being adapted to receive either of a first imaging module or a second imaging module;
first resources stored in said memory for supporting operation of said image capture and processing circuit when said first imaging module is connected to said image capture and processing circuit;
second resources stored in said memory for supporting operation of said image capture and processing circuit when said second imaging module is connected to said image capture and processing circuit;
said terminal being adapted so that either of said first resources and said second resources can be activated; and
wherein said first imaging module is a plural image sensor imaging module and wherein said second imaging module is a single image sensor imaging module, wherein said first resources when active adapt said image capture and processing circuit to support operation of said first imaging module and wherein said second resources when active adapt said image capture and processing circuit to support operation of said second imaging module.

CC2. The circuit of claim CC1, wherein said terminal is adapted so that resources corresponding to a particular imaging module can be activated responsively to an imaging module being connected thereto.

CC3. The circuit of claim CC1, wherein said terminal can be actuated responsively to a user initiated command.

DD1. An image capture and processing circuit for use in an indicia reading terminal, the image capture and processing circuit comprising:
a memory and a processor;
the memory for retaining frames of image data that can be processed by said processor;
the image capture and processing circuit being adapted to receive either of a first imaging module or a second imaging module;
first resources stored in said memory for supporting operation of said image capture and processing circuit when said first imaging module is connected to said image capture and processing circuit;
second resources stored in said memory for supporting operation of said image capture and processing circuit when said second imaging module is connected to said image capture and processing circuit;
said terminal being adapted so that either of said first resources and said second resources can be activated; and
wherein said first imaging module is a first type of a plural image sensor imaging module and wherein said second imaging module is second type of a plural image sensor imaging module, and wherein each of said first resources and second resources when active adapt said image capture and processing circuit to support operation of a plural image sensor imaging module.

DD2. The circuit of claim DD1, wherein said terminal is adapted so that resources corresponding to a particular imaging module can be activated responsively to an imaging module being connected thereto.

EE1. A kit for use in manufacturing indicia reading terminals, said kit comprising:
an image capture and processing circuit including a memory for retaining frames of image data and a processor that can address said memory for processing of said frames;
a first imaging module having first and second image sensors and optics for focusing images onto said first and second image sensors, the first imaging module having a plurality of video contacts, said first imaging module having a multiplexer receiving image data representing light incident on said first and second image sensors of said first imaging module and outputting image data for transmission through said plurality of video contacts of said first imaging module;
a second imaging module having a single image sensor and optics for focusing images onto said single image sensor, the second imaging module also having a plurality of video contacts;
wherein said image capture and processing circuit is adapted to receive one of said first imaging module and said second imaging module at a given time; and
wherein said plurality of video data contacts of said first imaging module is equal to a number of video contacts of said second imaging module.

EE2. The kit of claim EE1, wherein said image capture and processing circuit is capable of reading identifying information from either of said first imaging module or said second imaging module.

FF1. An imaging module comprising:
a first image sensor;
a second image sensor;
a printed circuit board for carrying at least one of said first and second image sensor;
optics for focusing images onto said first image sensor and said second image sensor;

a connector port for outputting image data, the connector port having a plurality of video contacts; wherein said imaging module is adapted so that said first image sensor, said second image sensor, and said connector port are held in certain positions relative to one another; and wherein said imaging module is adapted so that said imaging module can output through certain contacts of said plurality of video contacts image data corresponding to image signals generated by either one of said first image sensor or said second image sensor so that a number of said plurality of video contacts is less than a sum of a bit resolution of image data corresponding to image signals generated by said first image sensor and a bit resolution of image data corresponding to image signals generated by said second image sensor.

FF2. The imaging module of claim FF1, wherein said imaging module is adapted to send identifying information of said module to an external circuit when connected to said external circuit.

FF3. The imaging module of claim FF2, wherein said identifying information is an imaging module serial number.

FF4. The imaging module of claim FF2, wherein said identifying information is image data that can be processed by said external circuit.

FF5. The imaging module of claim FF1, wherein said connector port is mounted on said printed circuit board.

FF6. The imaging module of claim FF1, wherein said imaging module is adapted so that said connector port is maintained in a certain position relative to said circuit board.

GG1. A kit for use in manufacturing indicia reading terminals, said kit comprising:

an image capture and processing circuit including a memory for retaining frames of image data and a processor that can address said memory for processing of said frames;

a first imaging module having first and second image sensors and optics for focusing images onto said first and second image sensors, the first imaging module having a plurality of video contacts, said first imaging module having a multiplexer receiving image data representing light incident on said first and second image sensors of said first imaging module and outputting image data for transmission through said plurality of video contacts of said first imaging module;

a second imaging module having a single image sensor and optics for focusing images onto said single image sensor, the second imaging module also having a plurality of video data contacts;

wherein said image capture and processing circuit is adapted to receive one of said first imaging module and said second imaging module at a given time; and wherein said first imaging module is adapted so that said first imaging module can output through certain contacts of said plurality of video contacts of said first imaging module image data corresponding to image signals generated by either one of said first image sensor and said second image sensor of said first imaging module.

GG2. The kit of claim GG1, wherein a number of said plurality of video contacts of said first imaging module is equal to a number of said plurality of video contacts of said second image sensor.

HH1. An imaging module for use in decoding a decodable indicia disposed on a substrate, said imaging module comprising:

a printed circuit board commonly carrying a first image sensor and a second image sensor;

a first imaging lens assembly for focusing images onto said first image sensor;

a second imaging lens assembly for focusing images onto said second image sensor;

a single piece support assembly for supporting components of both said first imaging lens assembly and said second imaging lens assembly, the single piece support assembly being supported on said circuit board;

wherein said first image sensor and said first imaging lens assembly define a first imaging assembly having a first field of view;

wherein said second image sensor and said second imaging lens assembly define a second imaging assembly having a second field of view;

wherein said imaging module is adapted so that said first field of view and said second field of view can be defined in at least partially overlapping relation on said substrate;

wherein said imaging module includes a first light source bank, the imaging module being adapted so that light emitted by said first light source bank is projected into positions on said substrate within each of said first and second fields of view; and wherein said imaging module includes a second light source bank, the imaging module being adapted so that light emitted by said second light source bank is projected into positions on said substrate within each of said first and second fields of view.

HH2. The imaging module of claim HH1 wherein each of said first light source bank and said second light source bank are mounted on said circuit board carrying said first and second image sensor.

II1. An indicia reading terminal comprising:

an imaging module having one or more image sensors, a printed circuit board and at least one imaging lens assembly, wherein circuitry of said imaging module outputs digitized multi-bit image data;

an image capture and processing circuit having a processor and an addressable memory addressable by said processor, the memory for retaining frames of image data corresponding to image signals generated by said imaging module;

a parallel to serial converter disposed on said imaging module and receiving for conversion said digitized multi-bit image data;

wherein said image capture and processing circuit includes a serial to parallel converter, the terminal further including a fiber optic cable facilitating communication between said parallel to serial and said serial to parallel converter, the parallel to serial converter outputting an optical signal for transmission on said fiber optic cable, the serial to parallel converter recovering said multi-bit image data being input to said parallel to serial converter and outputting data for retaining in said memory; and a hand held housing incorporating both of said imaging module and said image capture and processing circuit.

II5. The terminal of claim II1, wherein said image capture and processing circuit is disposed on a motherboard spaced apart from said imaging module.

While the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

We claim:

1. A hand held indicia reading terminal for reading a decodable indicia disposed on a substrate, said hand held indicia reading terminal comprising:

an imaging assembly comprising an image sensor generating image signals and an imaging lens focusing an image onto an active surface of said image sensor, the imaging assembly having a field of view defined on said substrate when an imaging axis of said imaging assembly is directed toward said substrate;

a working memory receiving image data corresponding to said image signals;

a first illumination assembly having a first light source bank directing light toward said field of view;

a second illumination assembly having a second light source bank directing light toward said field of view;

a trigger button;

wherein said terminal is adapted so that when a trigger signal is active said terminal operates in a first mode until a timeout period has expired and then switches to a second mode;

wherein said terminal in said first mode receives into said working memory for decoding processing a plurality of frames, each frame subject to decoding processing in said first mode having a common illumination profile, wherein said terminal is adapted so that said timeout period is satisfied conditionally on the condition that subjecting multiple frames of said plurality of frames received in said first mode having a common illumination profile to decoding processing is not successful in determining a decoded message corresponding to said decoded indicia prior to said timeout period;

wherein said terminal in said second mode varies an illumination profile of received frames received for decoding processing in such manner that in said second mode said terminal receives into a said working memory a certain and a subsequent frame of image data, wherein each of the certain and subsequent frames has a corresponding exposure period, wherein said certain frame of image data has a first illumination profile and said subsequent frame of image data has a second illumination profile, the first illumination profile being different than said second illumination profile, the first illumination profile being characterized by said first light source bank being ON and said second light source bank being OFF during said exposure period corresponding to said certain frame, said second illumination profile being characterized by said first light source bank being OFF and said second light source bank being ON during said exposure period corresponding to said subsequent frame of image data;

wherein said terminal is adapted to subject to decoding processing each of said certain and subsequent frames of image data received in said second mode.

2. A hand held indicia reading terminal for reading a decodable indicia disposed on a substrate, said hand held indicia reading terminal comprising:

a first imaging assembly comprising a first image sensor generating image signals and an imaging lens focusing an image onto an active surface of said first image sensor, the imaging assembly having a first field of view defined on said substrate when an imaging axis of said imaging assembly is directed toward said substrate;

a second imaging assembly comprising a second image sensor generating image signals and an imaging lens focusing an image onto an active surface of said second image sensor, the imaging assembly having second field of view defined on said substrate overlapping said first field of view when an imaging axis of said imaging assembly is directed toward said substrate;

a working memory, wherein said terminal is adapted so that said terminal can receive image data corresponding to image signals generated either by said first image sensor or said second image sensor into said working memory;

a first illumination assembly having a first light source bank directing light toward said first and second fields of view;

a second illumination assembly having a second light source bank directing light toward said first and second fields of view;

wherein said terminal is adapted so that when a trigger signal is active said terminal operates in a first mode until a timeout period has expired and then switches to a second mode;

wherein said terminal in said first mode receives a plurality of frames of image data for decoding processing, each of said plurality of frames of image data received in said first mode having an illumination profile characterized by said first and second light source banks being ON during each exposure period corresponding to one of said plurality of frames, wherein said terminal is adapted so that said timeout period is satisfied conditionally on the condition that subjecting multiple frames of said plurality of frames received in said first mode having an illumination profile characterized by said first and second light source banks being ON during each exposure period corresponding to one of said plurality of frames to decoding process is not successful in determining a decoded message corresponding to said decodable indicia prior to said timeout period;

wherein said terminal in said second mode varies an illumination profile of received frames received for decoding processing in such manner that in said second mode said terminal receives into a said working memory a certain and a subsequent frame of image data, wherein each of the certain and subsequent frames has a corresponding exposure period, wherein said certain frame of image data has a first illumination profile and said subsequent frame of image data has a second illumination profile, the first illumination profile being different than said second illumination profile, the first illumination profile being characterized by said first light source bank being ON and said second light source bank being OFF during said exposure period corresponding to said certain frame, said second illumination profile being characterized by said first light source bank being OFF and said second light source bank being ON during said exposure period corresponding to said subsequent frame of image data.

3. The hand held indicia reading terminal of claim 2, wherein one of said first and second image sensors is a linear image sensor and a remaining of said first and second image sensors is a two dimensional image sensor.

4. A hand held indicia reading terminal for reading a decodable indicia disposed on a substrate, said hand held indicia reading terminal comprising:

a first imaging assembly comprising a first image sensor generating image signals and an imaging lens focusing an image onto an active surface of said first image sensor, the imaging assembly having a first field of view defined on said substrate when an imaging axis of said imaging assembly is directed toward said substrate;

a second imaging assembly comprising a second image sensor generating image signals and an imaging lens focusing an image onto an active surface of said second image sensor, the imaging assembly having second field of view defined on said substrate overlapping said first field of view when an imaging axis of said imaging assembly is directed toward said substrate;

a working memory, wherein said terminal is adapted so that said terminal can receive image data corresponding to image signals generated either by said first image sensor or said second image sensor into said working memory;

a first illumination assembly having a first light source bank directing light toward said first and second fields of view;

a second illumination assembly having a second light source bank directing light toward said first and second fields of view;

wherein said terminal is adapted so that when a trigger signal is active said terminal operates in a first mode until a timeout period has expired and then switches to a second mode;

wherein said terminal in said first mode receives a plurality of frames of image data for decoding processing, each of said plurality of frames of image data received in said first mode representing light incident on said first image sensor, wherein said terminal is adapted so that said timeout period is satisfied conditionally on the condition that subjecting multiple frames of said plurality of frames received in said first mode representing light incident on said first image sensor to decoding processing is not successful in determining a decoded message corresponding to said decoded indicia prior to said timeout period;

wherein said terminal in said second mode varies a source of received frames received for decoding processing in such manner that in said second mode said terminal receives into a said working memory for decoding processing a certain and a subsequent frame of image data, wherein said certain frame represents light incident on said first image sensor, and wherein said subsequent frame represents light incident on said second image sensor.

5. The hand held indicia reading terminal of claim 4, wherein one of said first and second image sensors is a linear monochrome image sensor and a remaining of said first and second image sensors is a two dimensional color image sensor.

6. A hand held indicia reading terminal for reading a decodable indicia disposed on a substrate, said hand held indicia reading terminal comprising:

a first imaging assembly comprising a first image sensor generating image signals and an imaging lens focusing an image onto an active surface of said first image sensor, the imaging assembly having a first field of view defined on said substrate;

a second imaging assembly comprising a second image sensor generating image signals and an imaging lens focusing an image onto an active surface of said second image sensor, the imaging assembly having a second field of view defined on said substrate overlapping said first field of view when an imaging axis of said imaging assembly is directed toward said substrate;

wherein said terminal is adapted so that when a trigger signal is active said terminal receives into a working memory for decoding processing a certain and a subsequent frame of image data, the certain frame of image data representing light incident on said first image sensor, the subsequent frame of image data representing light incident on said second image sensor;

wherein said terminal is adapted so that said terminal can process said certain frame of image data to determine a first set of code words, process said subsequent frame of image data to determine said second set of code words and combine said first and second set of code words; and wherein said first image sensor is provided by a first integrated circuit chip, wherein said second image sensor is provided by a second integrated circuit chip, said first integrated circuit chip and said second integrated circuit chip being commonly mounted to a single printed circuit board, wherein an infinitely extending imaginary straight line encompassing an imaging axis of said first imaging assembly extends through the single printed circuit board, wherein an infinitely extending imaginary straight line encompassing an imaging axis of the second imaging assembly extends through the single printed circuit board.

7. The hand held indicia reading terminal of claim 6, wherein said first imaging assembly and said second imaging assembly have different fixed best focus distances.

8. A hand held indicia reading terminal for reading a decodable indicia disposed on a substrate, said hand held indicia reading terminal comprising:

a first imaging assembly comprising a first image sensor having a plurality of pixels and generating image signals and an imaging lens focusing an image onto an active surface of said first image sensor, the imaging assembly having a first field of view defined on said substrate, wherein said first image sensor is a monochrome image sensor;

a second imaging assembly comprising a second image sensor having a plurality of pixels generating image signals and an imaging lens focusing an image onto an active surface of said second image sensor, the imaging assembly having second field of view defined on said substrate overlapping said first field of view when an imaging axis of said imaging assembly is directed toward said substrate, wherein said second image sensor is a color image sensor having color filter elements formed over pixels of said plurality of pixels;

a color processing module for processing an input raw color frame of image data into a monochrome frame of image data;

wherein said terminal is adapted so that when a trigger signal is active said terminal receives into a working memory for decoding processing a certain and a subsequent frame of image data, the certain frame of image data representing light incident on said first image sensor, the subsequent frame of image data representing light incident on said second image sensor; and wherein said terminal is adapted so that said terminal selectively avoids activating said color processing module when said certain frame of image data is received into said working memory and selectively activates said color processing module when said subsequent frame of image data is received into said working memory.

9. The hand held indicia reading terminal of claim 8, wherein said first image sensor is a linear monochrome image sensor and said second image sensor is a two dimensional color image sensor.

10. An imaging module for use in decoding a decodable indicia disposed on a substrate, said imaging module comprising:

a printed circuit board commonly carrying a first image sensor and a second image sensor;

a first imaging lens assembly for focusing images onto said first image sensor;

a second imaging lens assembly for focusing images onto said second image sensor;

a single piece support assembly for supporting components of both said first imaging lens assembly and said second imaging lens assembly, the single piece support assembly being supported on said circuit board;

wherein said first image sensor and said first imaging lens assembly define a first imaging assembly having a first field of view;

wherein said second image sensor and said second imaging lens assembly define a second imaging assembly having a second field of view;

wherein said imaging module is adapted so that said first field of view and said second field of view can be defined in at least partially overlapping relation on said substrate;

wherein said imaging module includes a first light source bank, the imaging module being adapted so that light emitted by said first light source bank is projected into positions on said substrate within each of said first and second fields of view; and wherein said imaging module includes a second light source bank, the imaging module being adapted so that light emitted by said second light source bank is projected into positions on said substrate within each of said first and second fields of view.

11. The imaging module of claim 10 wherein each of said first light source bank and said second light source bank are mounted on said circuit board carrying said first and second image sensor.

12. A hand held indicia reading terminal for reading a decodable indicia disposed on a substrate, said hand held indicia reading terminal comprising:

an imaging assembly comprising a first and second imaging assembly each having an image sensor generating image signals and an imaging lens focusing an image onto an active surface of said image sensors, said first assembly having a first field of view defined on said substrate, said second imaging assembly having a second field of view defined on said substrate overlapping said first field of view when an imaging axis of said imaging assembly is directed toward said substrate;

a working memory receiving image data corresponding to said image signals;

wherein said terminal is adapted so that when a trigger signal is active said terminal receives into said working memory for decoding processing a certain and a subsequent frame of image data, the certain frame of image data representing light incident on said first image sensor, the subsequent frame of image data representing light incident on said second image sensor;

wherein said terminal is adapted so that said terminal can process said certain frame of image data to determine a first set of code words, process said subsequent frame of image data to determine said second set of code words and combine said first and second set of code words;

wherein said first image sensor is provided by a first integrated circuit chip, wherein said second image sensor is provided by a second integrated circuit chip, said first integrated circuit chip and said second integrated circuit chip being commonly mounted to a single printed circuit board, wherein an infinitely extending imaginary straight line encompassing an imaging axis of said first imaging assembly extends through the single printed circuit board, wherein an infinitely extending imaginary straight line encompassing an imaging axis of the second imaging assembly extends through the single printed circuit board.

13. A hand held indicia reading terminal for reading a decodable indicia disposed on a substrate, said hand held indicia reading terminal comprising:

a first imaging assembly comprising a first image sensor having a plurality of pixels and generating image signals and an imaging lens focusing an image onto an active surface of said first image sensor, the imaging assembly having a first field of view defined on said substrate, wherein said first image sensor is a monochrome image sensor;

a second imaging assembly comprising a second image sensor having a plurality of pixels generating image signals and an imaging lens focusing an image onto an active surface of said second image sensor, the imaging assembly having second field of view defined on said substrate overlapping said first field of view when an imaging axis of said imaging assembly is directed toward said substrate, wherein said second image sensor is a color image sensor having color filter elements formed over pixels of said plurality of pixels;

a working memory receiving image data corresponding to said image signals;

a first illumination assembly having a first light source bank directing light toward said field of view;

a second illumination assembly having a second light source bank directing light toward said field of view;

a color processing module for processing an input raw color frame of image data into a monochrome frame of image data;

wherein said terminal is adapted so that when a trigger signal is active said terminal receives into said working memory a certain and a subsequent frame of image data, wherein each of the certain and subsequent frames has a corresponding exposure period, wherein said certain frame of image data has a first illumination profile and said subsequent frame of image data has a second illumination profile, the first illumination profile being different than said second illumination profile, the first illumination profile being characterized by said first light source bank being ON and said second light source bank being OFF during said exposure period corresponding to said certain frame, said second illumination profile being characterized by said first light source bank being OFF and said second light source bank being ON during said exposure period corresponding to said subsequent frame of image data;

wherein said terminal is adapted so that said terminal can process said certain frame of image data to determine a first set of code words, process said subsequent frame of image data to determine said second set of code words and combine said first and second set of code words;

wherein said terminal is adapted so that when a trigger signal is active said terminal receives into a working memory for decoding processing a certain and a subsequent frame of image data, the certain frame of image data representing light incident on said first image sensor, the subsequent frame of image data representing light incident on said second image sensor; and wherein said terminal is adapted so that said terminal selectively avoids activating said color processing module when said certain frame of image data is received into said working memory and selectively activates said color processing module when said subsequent frame of image data is received into said working memory.

14. A hand held indicia reading terminal for reading a decodable indicia disposed on a substrate, said hand held indicia reading terminal comprising:

an imaging assembly comprising an image sensor generating image signals and an imaging lens focusing an image onto an active surface of said image sensor, the imaging assembly having a field of view defined on said substrate when an imaging axis of said imaging assembly is directed toward said substrate;

a working memory receiving image data corresponding to said image signals;

a first illumination assembly having a first light source bank directing light toward said field of view;

a second illumination assembly having a second light source bank directing light toward said field of view;

a trigger button;

wherein said terminal is adapted so that when a trigger signal is active said terminal operates in a first mode until a timeout period has expired and then switches to a second mode;

wherein said terminal in said first mode receives into said working memory for decoding processing a plurality of frames, each frame subject to decoding processing in said first mode having a common illumination profile, wherein said terminal is adapted so that said timeout period is satisfied conditionally on the condition that subjecting multiple frames of said plurality of frames received in said first mode having a common illumination profile to decoding processing is not successful in determining a decoded message corresponding to said decoded indicia prior to said timeout period;

wherein said terminal in said second mode varies an illumination profile of received frames received for decoding processing in such manner that in said second mode said terminal receives into a said working memory a certain and a subsequent frame of image data, wherein each of the certain and subsequent frames has a corresponding exposure period, wherein said certain frame of image data has a first illumination profile and said subsequent frame of image data has a second illumination profile, the first illumination profile being different than said second illumination profile, the first illumination profile being characterized by said first light source bank being ON and said second light source bank being OFF during said exposure period corresponding to said certain frame, said second illumination profile being characterized by said first light source bank being OFF and said second light source bank being ON during said exposure period corresponding to said subsequent frame of image data;

wherein said terminal is adapted to subject to decoding processing each of said certain and subsequent frames of image data received in said second mode.

15. A hand held indicia reading terminal for reading a decodable indicia disposed on a substrate, said hand held indicia reading terminal comprising:

a first imaging assembly comprising a first image sensor having a plurality of pixels and generating image signals and an imaging lens focusing an image onto an active surface of said first image sensor, the imaging assembly having a first field of view defined on said substrate when an imaging axis of said imaging assembly is directed toward said substrate and said first image sensor is a monochrome image sensor;

a second imaging assembly comprising a second image sensor having a plurality of pixels generating image signals and an imaging lens focusing an image onto an active surface of said second image sensor, the imaging assembly having second field of view defined on said substrate overlapping said first field of view when an imaging axis of said imaging assembly is directed toward said substrate, wherein said second image sensor is a color image sensor having color filter elements formed over pixels of said plurality of pixels;

a color processing module for processing an input raw color frame of image data into a monochrome frame of image data;

a working memory, wherein said terminal is adapted so that said terminal can receive image data corresponding to image signals generated either by said first image sensor or said second image sensor into said working memory;

a first illumination assembly having a first light source bank directing light toward said first and second fields of view;

a second illumination assembly having a second light source bank directing light toward said first and second fields of view;

wherein said terminal is adapted so that when a trigger signal is active said terminal operates in a first mode until a timeout period has expired and then switches to a second mode;

wherein said terminal in said first mode receives a plurality of frames of image data for decoding processing, each of said plurality of frames of image data received in said first mode representing light incident on said first image sensor, wherein said terminal is adapted so that timeout period is satisfied conditionally on the condition that subjecting multiple frames of said plurality of frames received in said first mode representing light incident on said first image sensor to decoding processing is not successful in determining a decoded message corresponding to said decoded indicia prior to said timeout period;

wherein said terminal in said second mode varies a source of received frames received for decoding processing in such manner that in said second mode said terminal receives into a said working memory for decoding processing a certain and a subsequent frame of image data, wherein said certain frame represents light incident on said first image sensor, and wherein said subsequent frame represents light incident on said second image sensor;

wherein said terminal is adapted so that when a trigger signal is active said terminal receives into a working memory for decoding processing a certain and a subsequent frame of image data, the certain frame of image data representing light incident on said first image sensor, the subsequent frame of image data representing light incident on said second image sensor; and wherein said terminal is adapted so that said terminal selectively avoids activating said color processing module when said certain frame of image data is received into said working memory and selectively activates said color processing module when said subsequent frame of image data is received into said working memory.

* * * * *